(12) United States Patent
Gyger et al.

(10) Patent No.: US 9,797,519 B2
(45) Date of Patent: Oct. 24, 2017

(54) MICRO-VALVE

(75) Inventors: Fritz Gyger, Gwatt (CH); Reto Gyger, Gwatt (CH)

(73) Assignee: Fritz Gyger AG, Thun-Gwatt (CH)

(*) Notice: Subject to any disclaimer, the term of this patent is extended or adjusted under 35 U.S.C. 154(b) by 1046 days.

(21) Appl. No.: 12/448,863

(22) PCT Filed: Jan. 10, 2008

(86) PCT No.: PCT/CH2008/000012
§ 371 (c)(1),
(2), (4) Date: Jan. 11, 2010

(87) PCT Pub. No.: WO2008/083509
PCT Pub. Date: Jul. 17, 2008

(65) Prior Publication Data
US 2011/0042605 A1 Feb. 24, 2011

(30) Foreign Application Priority Data
Jan. 10, 2007 (CH) ........................ 0023/07

(51) Int. Cl.
*F02M 59/00* (2006.01)
*F16K 25/00* (2006.01)
*F16K 1/42* (2006.01)

(52) U.S. Cl.
CPC .............. *F16K 25/005* (2013.01); *F16K 1/42* (2013.01); *Y10T 29/49409* (2015.01)

(58) Field of Classification Search
CPC ..... F16K 25/005; F16K 1/42; Y10T 29/49409
USPC ................ 239/289, 533.2; 251/333, 359
See application file for complete search history.

(56) References Cited

U.S. PATENT DOCUMENTS

| 4,228,821 | A | * | 10/1980 | Stark ........................ F16K 1/14 137/533.11 |
| 4,606,367 | A | | 8/1986 | Britt |
| 5,921,473 | A | * | 7/1999 | Romann ............ F02M 51/0657 239/533.2 |

(Continued)

FOREIGN PATENT DOCUMENTS

| DE | 4215892 | 11/1992 |
| DE | 19509776 | 9/1996 |

(Continued)

*Primary Examiner* — Arthur O Hall
*Assistant Examiner* — Joel Zhou
(74) *Attorney, Agent, or Firm* — Pauley Erickson & Kottis

(57) ABSTRACT

The invention relates to a micro-valve (1) comprising a valve ball (2), a valve seat (3) and a nozzle (14). In said valve, the valve seat (3) comprises a sealing region (5) and an outlet region (6) and guide means (40) are provided on the valve seat. The guide element is configured in the valve seat (3) in the form of a guide region (4) or a one-piece guide element (40) located in the vicinity of the valve seat (3). The micro-valves according to the invention exhibit substantial improvements with respect to dynamics, life cycle and stream pattern. In first embodiments, increased wear-resistance is achieved by the integration of guide means, in the form of a guide region (4), into the valve seat, optimizing the dimensions of the transition angle, guide angle and discharge angle. In versions comprising a one-piece guide element (40), wear is reduced by the fact that the ball primarily carries out a sealing function and a guide function to a lesser degree.

15 Claims, 18 Drawing Sheets

(56) References Cited

U.S. PATENT DOCUMENTS

| | | |
|---|---|---|
| 6,173,494 B1 | 1/2001 | Becker |
| 6,502,769 B2 * | 1/2003 | Imoehl ..................... 239/533.12 |
| 7,780,144 B2 * | 8/2010 | Van Der Linden .. F02M 59/462 |
| | | 137/539 |
| 2004/0041709 A1 | 3/2004 | Forster |
| 2005/0067508 A1 * | 3/2005 | Imoehl ................. F02M 61/168 |
| | | 239/533.12 |
| 2005/0279867 A1 * | 12/2005 | Ismailov ................. F02D 41/20 |
| | | 239/585.1 |
| 2006/0076437 A1 * | 4/2006 | Dallmeyer ........... F02M 51/005 |
| | | 239/585.1 |
| 2007/0068580 A1 * | 3/2007 | Van Der Linden .. F02M 59/462 |
| | | 137/539 |
| 2008/0279707 A1 * | 11/2008 | Fuchs ................. F02M 59/464 |
| | | 417/559 |

FOREIGN PATENT DOCUMENTS

| | | | | |
|---|---|---|---|---|
| DE | 19527049 | | 1/1997 | |
| DE | 19741816 | | 2/2000 | |
| FR | 981999 | * | 6/1951 | ............ F16K 15/04 |
| JP | 9068134 | | 3/1997 | |

* cited by examiner

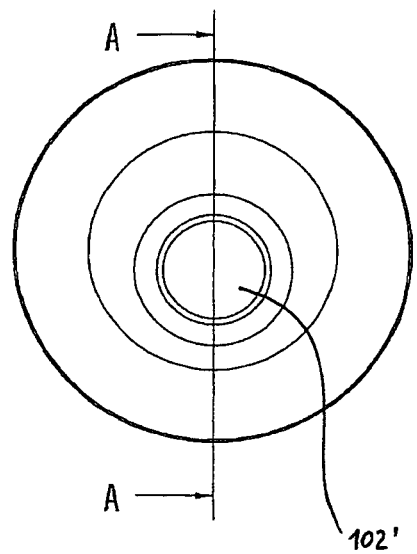
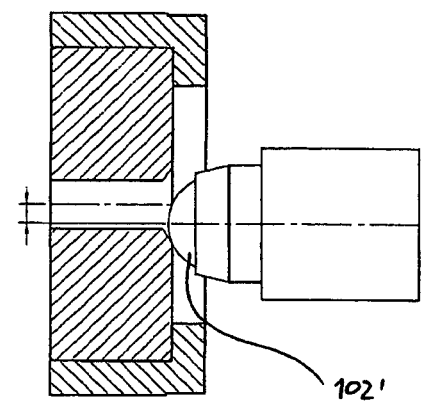
Fig. 11a                Fig. 11b
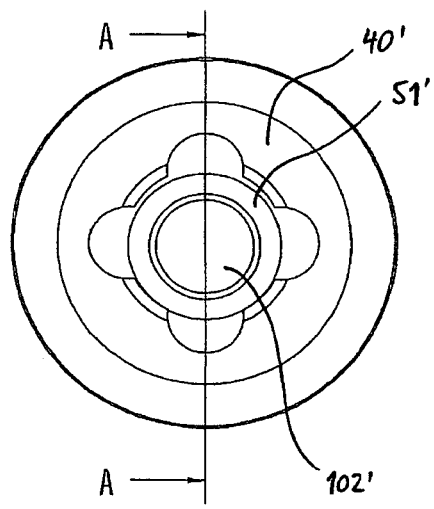
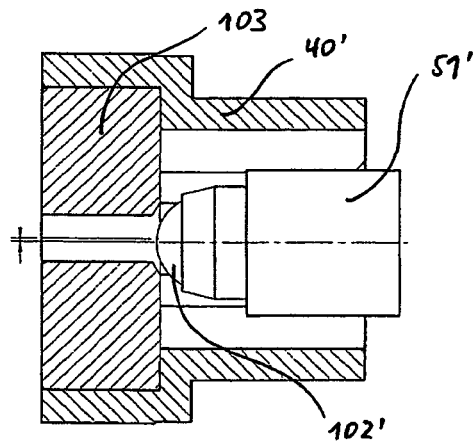
Fig. 11c                Fig. 11d Fig. 13a   40'''   44'''

MICRO-VALVE

BACKGROUND OF THE INVENTION

Field of the Invention

Micro-valves which are suitable for metering very small amounts and for correspondingly high switching frequencies have been known for a relatively long time. For example, for some years, the applicant has been extremely successfully producing and marketing micro-valves, for example modular micro-valves of various types, which are used in a wide range of technical and scientific applications. The application options include industrial inkjet printers, printers for Braille script, chemical analysis technology (laboratory automation, Life Science), installations for high-throughput screening, and micro- and nano-metering technology. In this case, it is possible to make use of low-viscosity media such as water, aqueous solutions, organic and/or inorganic solvents, and, in particular, also high-viscosity media such as oils, greases, inks and adhesives. The consistent use of high-quality materials, such as sapphire and ruby, for the valve seat, and respectively for the valve ball ensures optimum chemical compatibility and resistance. At the same time, this completely avoids swelling of the valve seat, as is known when micro-valves have a seat composed of plastic material. The sealing technique using a hard-material pair (sapphire/ruby) allows very short opening travels of a few hundredths of a millimeter for metering, and, because of the high wear resistance of these materials, ensures a stable valve geometry and thus relatively good sealing and a relatively accurate and reproducible metered amount for several million opening and closing processes, which are also referred to in the following text as switching operations or travels. In these valves, the valve seat comprises a conical hole with a ground-in spherical zone as a sealing seat for a valve ball, with the spherical zone having the same radius as the valve ball that is used. In this case, the term spherical zone means a geometrically defined surface whose area A is given by the formula $A=2\pi rh$. In this case, r is the ball radius and h is the height of the layer which is cut from a ball. The valve ball is held in an armature which, driven by a spiral spring, presses the ball into the valve seat. The end of the armature facing away from the ball is mounted in a coil former such that it can move and can be drawn into the coil former by connection of a circuit to the coil, in order to open the valve. The valve ball is not guided in the valve and therefore moves freely within the conical hole. One disadvantage that has been found is that, because of the rapid switching operations, both the valve seat and the valve ball show traces of wear over a relatively long time, adversely affecting the sealing. A further problem, particularly in the case of sticky media, for example in the case of media which comprise easily volatile solvents and adhesive particles or in the case of adhesives, is that of the valve ball partially sticking in the valve seat, this having a negative influence on the switching cycles and rendering accurate metering impossible.

Discussion of Related Art

A further example of a micro-valve with a ball closure is disclosed in DE 19741816. In this case, the valve ball is completely free and unguided. The movement of the ball is limited only by the valve seat and the side walls of the valve chamber. The inlet channel is sufficiently wide that the ball can move completely into this inlet channel. The valve ball is pressed onto the valve seat only by the pressure and the suction effect of the flowing medium. Furthermore, a single piezo-element or an entire stack of piezo-elements are stacked on top of one another in the valve chamber, said piezo-elements expanding or contracting dependent on the electrical drive. In a first example, the ball is fired into the inlet channel out of its valve seat by sudden expansion of the piezo-elements, and the valve opening in the piezo-elements is released. A second embodiment makes use of the contraction capability of the piezo-elements as well as the inertia of the valve ball. The ball is raised out of the valve seat by rapid contraction, and the valve opening is released. In both cases, the valve closes passively by the suction effect or flow of the medium, thus pulling the valve ball into the valve seat again. High-quality materials such as ceramic, metal or sapphire are proposed for the valve seat and ruby is proposed for the valve ball, in order to reduce traces of wear on the ball and valve seat. Despite the choice of these materials, the wear on the valve seat and on the valve ball is considerable, since the valve ball is completely unguided and, during operation, can strike the channel walls and the surface of the piezo-stack around the valve opening, in an uncontrolled manner. A further disadvantage of this solution is that the opening time of the valve cannot be controlled individually, but can be predetermined only approximately by fixed parameters such as the pressure and viscosity of the medium, the mass and dimensions of the valve ball, the deflection capability of the piezo-elements and the size of the valve opening.

SUMMARY OF THE INVENTION

The invention is based on the object of providing a micro-valve which does not have the abovementioned disadvantages. One particular aim is to provide a micro-valve with better wear resistance than the prior art. A further aim is for very rapid switching operations to be possible with the micro-valve, and to allow a multiplicity of media, which differ in viscosity as well as chemical composition and aggressiveness, to be metered accurately.

This object is achieved by a micro-valve having the features of claim 1.

Further advantageous embodiments of the micro-valve according to the invention are specified in the dependent claims, and in the method claims.

One major feature of the apparatus according to the present invention is that the micro-valve having a valve ball, a valve seat and a nozzle has different areas, specifically a guide means, a sealing area and an outlet area.

One major feature of the apparatus according to preferred embodiments of the present invention is that the valve seat has the guide area, the sealing area and the outlet area. Each of these various areas have one or more associated different functions. It should be noted that a micro-valve having a valve ball is preferably designed to be rotationally symmetrical, at least in the actual valve area, that is to say in the area of the valve ball and of the valve seat. Said areas, the guide area, sealing area and outlet area, are therefore likewise rotationally symmetrical structures, in which case an actual nozzle channel can invariably be angled, and can therefore be designed not to be rotationally symmetrical. A valve ball is pressed into a valve seat to close the valve and thus provides sealing in the sealing area between the valve ball and the valve seat. It is obvious to a person skilled in the art that the valve ball need not necessarily be spherical, in the geometric sense. A body with a shape which is spherical only in the valve area can also be used for this purpose. In particular, in addition to a pure ball, shapes such as cones or cylinders with a spherical end are also feasible. Furthermore, the invention could also be implemented with an elliptical or some other convex rotationally symmetrical shape without departing from the idea of the invention. However, the following text refers only to a valve ball, in order to simplify understanding. In the flow direction of the medium to be metered, the outlet area is located before the sealing area of the guide area and behind the sealing area as a transition to the nozzle channel. The functions of said areas will be explained in more detail in the following text.

Together with the valve ball, an interlock which is as accurate as possible is produced in the sealing area. On the one hand, this can be done by using a soft material for the valve seat, which is matched to the shape of the valve ball, or vice versa, by matching the shape of the valve ball. Depending on the chosen material, this deformation may on the one hand be plastic or else elastic in a self-restoring form. However, the invention described here is based for other reasons on the use of very hard valve ball and valve seat materials, which means that deformation is not under discussion. A hard-material pair, preferably ruby and sapphire, or else ceramic, is used as the material for the valve ball and the valve seat. The sealing area must therefore be matched very accurately from the start to the shape of the valve ball, and is dependent on extraordinary manufacturing precision. This sealing area is preferably ground in by means of a grinding ball, thus forming a sealing area in the form of a spherical zone. In preferred embodiments of the present invention, the grinding ball has identical dimensions to the valve ball. As already mentioned above, the shape of the valve ball need not be spherical in the geometric sense, although, of course, the grinding medium and thus also the sealing area must then have this corresponding discrepancy.

According to further embodiments, the area over which the sealing area interacts with the valve ball is reduced. The reduction may be to such an extent that the valve ball still provides sealing only along a circumferential line which is formed by the contact points of the valve ball in the valve seat and in the guide area. This therefore makes it possible to avoid a complex processing step during production. However, this simplification of the seat geometry is desirable only in the case of valves in which the demands on the seal are not excessively high and there is no need to ensure complete precision sealing. By way of example, this is true in the case of so-called "low-cost" applications or in applications for high-viscosity media.

As the name suggests, the guide area holds the unguided or only loosely guided valve ball gently while the valve is closing, that is to say with a minimal force influence, in the valve seat, and guides this valve ball into the sealing area with as little wear as possible. During this process, the valve ball slides along one side of the guide area. Irrespective of whether the valve ball is lifted out of the area of the valve seat or does not leave it when the valve is open, the guide area ensures guidance into the sealing area. In this case, it is advantageous that the guide area has a gradient in the movement direction of the valve ball, such that the valve ball impacts on the guide area as steeply as possible, and therefore in a gentle manner. This is achieved in that an upper peripheral area of the guide area holds the valve ball with a steep gradient, that is to say with a large guide angle. The novel advantageous geometry of the valve seat according to the invention on the other hand also ensures that the guide area merges into the sealing area at as flat an angle as possible. Ideally, this transition is completely flat, that is to say the transition angle between the sealing area and the guide area is zero degrees.

It has been found that a transition angle of 20° is too great and often leads to traces of wear after only a small number of switching operations. In order to limit this wear, the transition angle according to the present invention is a maximum of 10°, preferably less than 7°, with the radii of curvature of the transition angles playing an important role, as will be explained in the following text.

The guide angle denotes the angle between the tangent at the contact point of the valve ball in the guide area and an imaginary auxiliary plane at right angles to the valve center axis. Alternatively, in the subsequent drawings, the guide angle is defined as the angle between the valve center axis and a line through the center of the valve ball and the contact point of the valve ball on the guide area. The guide angle is therefore dependent on the travel of the valve ball. According to preferred embodiments of the invention, it is a minimum of 25°, preferably more than 30°, and particularly preferably 45°. These conditions can be satisfied by a guide area in the form of a spherical zone, with the radius of the spherical zone of the guide area being greater than that of the sealing area and of the valve ball. The ratio of the two radii (radius of the sealing area:radius of the guide area) is preferably 1.01-1.2, particularly preferably a ratio of 1.1.

The geometry of the guide area furthermore defines an upper recess between the valve ball and the guide area, which assists in the opening of the valve, that is to say simple release of the valve ball from the sealing seat in the sealing area. This is particularly advantageous in the case of sticky media, since it considerably improves the "head open time". The "head open time" means the time which the valve can be closed for before the ball becomes stuck or before purging must be carried out.

One preferred method for production of the guide area is grinding in by means of a grinding ball which, according to the statements made above, preferably has a larger diameter than the valve ball. Other production methods can also be used, for example those by means of laser removal processes. The guide area need not necessarily be in the form of a spherical zone, and alternative concave shapes are also permissible.

The outlet area is preferably formed by a cone which tapers from the required diameter of the valve seat to the diameter of the nozzle channel in the flow direction of the medium to be metered. The outlet-area cone is directly adjacent to the sealing area and forms the transition from the sealing area to the nozzle channel. The aim is to form a release angle which is as large as possible to the sealing area. A large release angle makes it easier for the medium to be metered to flow and furthermore increases the "head open time" in that it prevents the valve ball from sticking in the sealing area, particularly when the media are sticky. The release angle is at least 10°, preferably >15°, and particularly preferably 20°.

According to one embodiment of the present invention, the outlet area is formed directly by the nozzle channel. However, it should be noted that the volume in the nozzle channel and in the lower recess behind the valve ball when the valve is closed must be kept small in order to prevent the medium to be metered from drying out or aging. The nozzle and valve seat may be composed of a plurality of parts, or may be formed integrally as a unit.

According to a further embodiment, a further reduction in the wear on the valve seat and valve ball is achieved by rounding the transitions between the individual zones. The radius in the transition between the guide area and the seat end surface is therefore preferably 0.02 to 0.1 mm, with a radius of 0.03 to 0.06 mm being particularly preferred. The radii at the transition between the guide area and the sealing area, and between the sealing area and the outlet area, are preferably somewhat less, and are 0.01 to 0.06 mm.

In the case of the valves according to the invention, the valve ball is preferably held, as illustrated in FIG. 2, at a lower end of a mobile armature, which applies a force from a valve spring to the valve ball, and presses it into the valve seat. The mobile armature is mounted with its upper end, facing away from the valve ball, in a coil former such that it can move and can be drawn into the coil former, against a stationary armature, by connection of a circuit to the coil, in order to open the valve.

According to a first group of preferred embodiments of the present invention, the mobile armature is not guided any further in the valve. The mobile armature is guided by the guide area in conjunction with the valve ball. This can be deflected freely within the guide area when the valve is open. If a sufficiently long travel is permitted, the valve ball can even be moved completely out of the area of the valve seat.

The application options of the valves according to the invention comprise industrial inkjet printers, printers for Braille script, chemical analysis technology (laboratory automation, Life Science) installations for high throughput screening, micro- and nano-metering technology. In this case, it is possible to make use of low-viscosity media such as water, aqueous solutions, inks based on water, organic and/or inorganic solvents such as N-propanol, dimethylsulfoxide (DMSO), methyl-ethyl-ketone (MEK) and other solvents, and, in particular, also of high-viscosity media such as oils, greases, inks, detergents and adhesives, or even gases. Optimum chemical compatibility and resistance are ensured by the consistent use of high-quality materials such as sapphire, ceramic and ruby for the valve seat, and respectively for the valve ball, and also of stainless steel for the further components of the micro-valve. At the same time, this completely avoids swelling of the valve seat, as is known when micro-valves have a seat composed of plastic material. The sealing technique using a hard-material pairing, preferably sapphire/ruby, allows very short opening travels of a few hundredths of a millimeter for metering, and, because of the high wear resistance of these materials and the specific configuration of the valve seat, ensures a stable valve geometry and thus good sealing and an accurate and reproducible metered amount for up to several thousand million opening and closing processes, which are also referred to in the following text as switching operations or travels. In combination with a very short valve response time, this leads to excellent dynamics and reproduction accuracy for the metering. The geometry of the valve nozzle is designed so as to achieve optimum droplet formation for non-contacting metering, directly from the nozzle. A further optimization in the quality of the metering can be achieved by the use of a filtration element in an inlet area of the valve.

The novel valve types allow a high degree of modularity. In addition to micro-valves in a compact form comprising a coil and the actual valve, and thus offering a narrow grid width of, for example, 4 mm, which is particularly advantageous in the field of inkjet printing, valves are also proposed in which the coil is separated from the actual valve, thus allowing the use of a coil core. These valves are still very compact, with a grid width of, for example, 4 mm.

Micro-valves with a higher throughput rate, that is to say which pass through a larger volume of media, are used for metering high-viscosity media.

Depending on the valve type, the maximum switching-operation speed is from 1000 Hz to 5000 Hz, preferably up to 3000 Hz.

The micro-valves according to the invention are operated electromagnetically, and the medium being metered flows directly through them. When not energized, the valve is closed. The closing ball or valve ball on the mobile armature is in this case pressed against the valve seat by the associated spring, as already described above. The valve opens when current flows through the valve coil, because the two armatures attract one another as a result of the magnetic field that is produced. The flow rate, which is metered during an opening cycle, is governed by the overpressure of the feed medium and the duration of the applied voltage pulse, with the overpressure of the medium being up to 70 bar, but preferably less than 10 bar. The alloy which is used for the armature is specifically chosen in order to achieve good chemical resistance and very short valve response times. The armature is preferably diamond-coated or is provided with some other suitable coating. These characteristics are very important for use in industrial inkjet printers or "high throughput" analysis systems.

For best performance at very high frequencies, the drive is preferably provided by using a stepped voltage pulse feed (peak and hold). The pulsed voltage can be produced by means of a chopper. In this case, rapid and defined opening of the valve is achieved by a short, increased voltage pulse (for example $U_P$=12 V or $U_P$=24 V). Once the valve has been opened, a lower holding voltage ($U_H$=2-3 V) is sufficient for the rest of the time for which it is open. This type of drive achieves very short valve response times with little heat being developed at the same time. Since the coil represents an inductive load, the profile of the control voltage is in reality distorted, and must be compensated for by suitable measures by the control electronics in order to reduce negative influences, particularly at high frequencies or when exact closing times (metering technology) are required.

A separation edge, that is to say a transition from the nozzle channel to an outer end surface with as sharp an edge as possible, is formed on the outlet zone, in order to allow good droplet separation. The radius of the separation edge is preferably 0.003 mm. The wetting characteristics of the outer end surface of the valve seat and/or of the nozzle, in particular the material and surface quality, are chosen in a known manner such that, as far as possible, they prevent wetting and any adhesion which may result from this. Sapphire has been found to be a highly suitable material for this purpose. It has also been found to be advantageous to offer a wetting area that is as small as possible.

In order to achieve very small metered amounts, it is advantageous to reduce the diameter of the nozzle channel to less than 0.15 mm. Since it is very difficult to manufacture valve seats composed of sapphire or ceramic with fine channels such as this, initial constrictions are used to restrict the fluid jet, according to further embodiments of the invention.

The design of the valve front part with an additional constriction can assist the metering of very small amounts in certain applications. Depending on the medium and the metering parameters, it is possible to further reduce the metered amounts by 20-70% in comparison to the designs described above. In order to achieve such very small droplet sizes, the diameter of an aperture opening in the initial constriction is greatly narrowed in comparison to the nozzle channel, which is preferably arranged coaxially. This restriction of the functional cross section of the fluid channel is achieved by the use of the constriction, making it possible to avoid the production difficulties which would undoubtedly have occurred if such fine holes were to be introduced into the nozzle block.

Since the restriction in the fluid channel occurs only shortly before the outlet point, the restriction is reduced to a minimum extent. The constriction insert, if appropriately scaled, is therefore suitable for both low-viscosity and high-viscosity media.

In order to achieve the desired effects, the diameter of the aperture opening in the constriction, which is preferably in the form of a disk, and the thickness of the constriction, as well as the diameter and the length of the nozzle channel, must be matched to one another. In contrast to the values mentioned above, in embodiments with an initial constriction, the channel length can be chosen to be shorter, depending on the viscosity of the medium to be metered. The diameter of the aperture opening in the construction is preferably 30-50% of the diameter of the nozzle channel. The ratio of the length of the aperture opening to its diameter is preferably 1:1 to 5:1.

The constriction may be produced from various materials, for example ceramics such as $ZrO_2$, hard metal or plastic. Depending on the chosen materials, the constriction is preferably attached to the valve seat by adhesive bonding or soldering, or by mechanical holders.

In the last-mentioned case, the constriction is drawn against the valve seat, according to one embodiment, by a union sleeve which is plugged over the outside of the valve housing. One advantage of this form of attachment is that there is no need for the constriction to be attached directly to the valve seat. For some applications, the use of a union sleeve is disadvantageous, since the nozzle outlet is no longer flush at the front.

It has been found that very good coaxial positioning of the initial construction and valve seat is achieved by both being introduced into the accommodation area of the guide element. For perfect operation of these micro-valves, it is necessary to comply with precise coaxiality tolerances for the holes/openings in the constriction and in the valve seat with respect to the respective external diameter. The coaxially correct alignment of the external diameters of the two parts with respect to one another can once again preferably be ensured by means of the guide element, which holds the two parts on the external diameter without any play.

According to one preferred embodiment, the aperture opening in the constriction is provided with a chamfer on the side facing the valve seat. The chamfer is used to improve the introduction of fluid into the restriction. The chamfer cone angle is preferably between 60 and 90°. The preferred values mentioned above for the length and the diameter of the cylindrical constriction aperture opening are preferably also retained for the embodiments with a chamfer. The thickness of the constriction is accordingly increased by the area occupied by the chamfer. The main advantage of a chamfered constriction opening is the better flow characteristics. The main disadvantage is that it is more complex to produce the constriction with the chamfer.

When light-sensitive and/or light-curing media are being metered, then the valve seat and/or nozzle and/or the initial constriction are advantageously manufactured from opaque material, or are made opaque.

BRIEF DESCRIPTION OF THE DRAWINGS

The invention will be explained in the following text with reference to figures which illustrate only exemplary embodiments, and in which:

FIG. 10b shows a cross section through a guide zone of the front area as shown in FIG. 10a;

FIG. 11a shows a schematic cross-sectional view of an unguided mobile armature in an open valve, in order to illustrate the relative position with respect to the valve seat;

FIG. 11b shows a schematic view of the unguided valve shown in FIG. 11a, along A-A, in the form of a longitudinal section in order to illustrate the deflection of the mobile armature with the valve ball with respect to the valve longitudinal axis.

FIG. 11c shows a schematic cross-sectional view of a guided mobile armature according to one embodiment to the invention, with the valve open, in order to illustrate the relative position with respect to the valve seat;

FIG. 11d shows a schematic view of the guided valve shown in FIG. 11c along A-A, in the form of a longitudinal section, in order to illustrate the deflection of the mobile armature with the valve ball with respect to the valve longitudinal axis;

FIG. 13a shows a front area of a further embodiment of the micro-valves according to the invention in the form of a longitudinal section, with the section plane running through the guide webs, and with the mobile armature with a closing ball, guide sleeve and spring not being illustrated in the section;

FIG. 14b shows a perspective view of a partially sectioned lower front area of a micro-valve according to a further embodiment of the invention, with an initial constriction as shown in FIG. 14a;

DETAILED DESCRIPTION OF THE EMBODIMENTS

Figure 1:
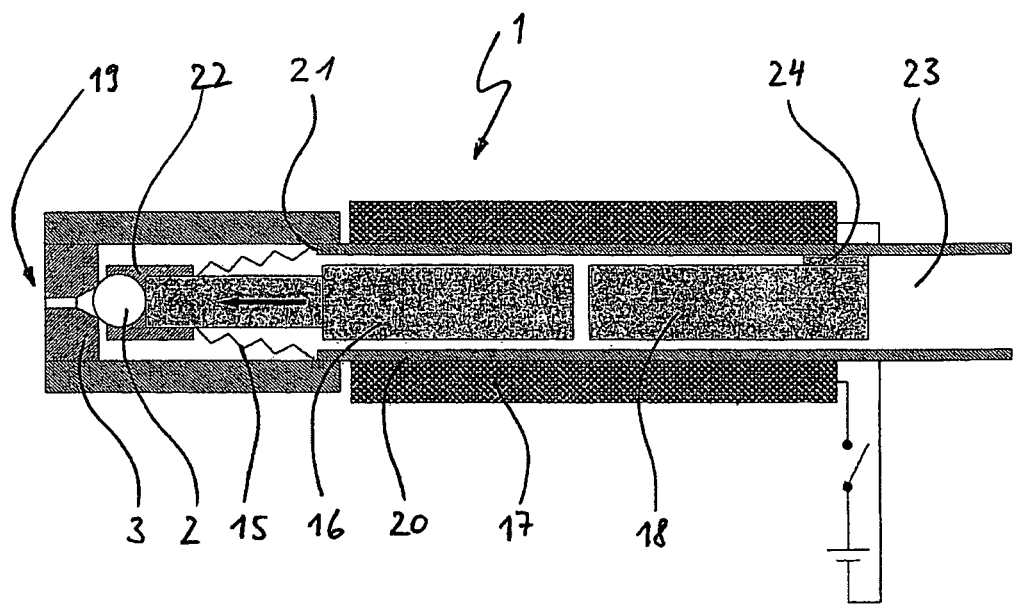
FIG. 1 shows a micro-valve in the closed state, in the form of a longitudinal section along the valve center axis.

FIG. 1 shows a first embodiment of the micro-valve 1 according to the invention, in the closed state. The illustrated micro-valve 1 comprises a nozzle 19 with a valve seat 3, a mobile armature 16 with a valve ball 2, and a valve body 20 with a coil 17, as well as a stationary armature 18. The mobile armature 16 is pressed into a closed position in the rest state, together with the valve ball 2 that is fitted to the mobile armature 16. This is done by the closing spring 15 which acts on the one hand on a step 21 in the valve body and on the other hand on the receptacle 22 of the valve ball. The valve ball 2, which is held by the mobile armature 16, is in this case seated in the valve seat 3 and thus closes the nozzle 19. Approximately half of the stationary armature 18 is seated in the area of the coil 17 and is held firmly in this position in the valve body 20 by means of a fixing 24. Both the mobile armature 16 and the stationary armature 18 have cross sections which are preferably not round but have a profiled structure, as a result of which the medium 23 to be metered flows around both the armatures 16, 18. The medium 23 to be metered is supplied in a known manner to the valve 1, for example by means of a supply line which is not illustrated in any more detail. An optional filtration element, which is not illustrated in the figure, in the inlet area of the valve and having a pore size of <17 µm, for example, represents an additional safety measurement with regard to sealing, blocking of the valve and metering accuracy.

In the illustrated exemplary embodiment, the valve seat 3 is made of sapphire, the valve ball 2 of ruby, and the valve body 20 and the two armatures 16 and 18 of stainless steel.

Figure 2:
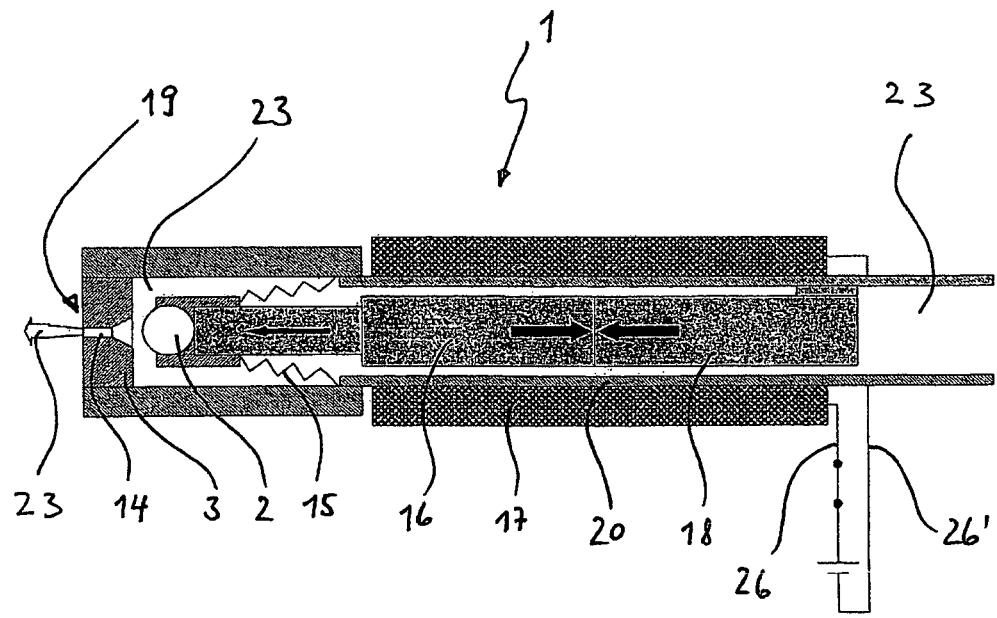
FIG. 2 shows the micro-valve from FIG. 1 in the open state.

FIG. 2 now shows the micro-valve 1 from FIG. 1 in its open state. This state is reached by moving the mobile armature 16 towards the stationary armature 18 electromagnetically by application of a voltage to the coil 17. The voltage is supplied from suitable control electronics via electrical supply lines 26, 26'. The movement of the mobile armature 16 raises the valve ball 2 out of its valve seat 3 against the spring force of the closing spring 15, thus releasing the nozzle channel 14 for the medium 23 to be metered. The medium 23, which is at an increased pressure of 0-70 bar, particularly preferably 0.3-1.5 bar, as in other embodiments, can now flow out of the supply line 25 through the valve body 20 around the two armatures 16, 18 and the valve ball 2, and can be emitted out of the nozzle 19, and therefore out of the micro-valve 1, through the nozzle channel 14.

The various areas of the valve seat 3 and the interaction between the valve seat 3 and the valve ball 2 are illustrated in the form of a greatly enlarged partial cross section in FIGS. 3a to 3d. The valve seat 3 comprises three different areas, specifically the guide area 4, the sealing area 5 and the outlet area 6. The sealing area 5 is designed such that, in this area, the valve ball 2 produces an interlocking sealed connection to the valve seat 3. The sealing area 5 in this example accurately fits the shape of the valve ball 2. In preferred refinements, the sealing area 5 is in the form of a spherical zone whose diameter corresponds to that of the valve ball.

It is clear to a person skilled in the art that both the sealing area 5 and the valve ball 2 need not have a spherical shape, without departing from the idea of the invention. However, these discrepancies are ideally identical both in the valve ball 2 and in the sealing area 5, as a result of which there is still an interlocking sealed connection. It is also feasible for the spherical zone of the sealing area 5 to have a larger diameter than the valve ball 2, as a result of which the sealing area 5 is reduced to a circumferential closed line, which is formed by the contact points of the valve ball 2 in the valve seat 3 and in the guide area 4.

Figure 3A:
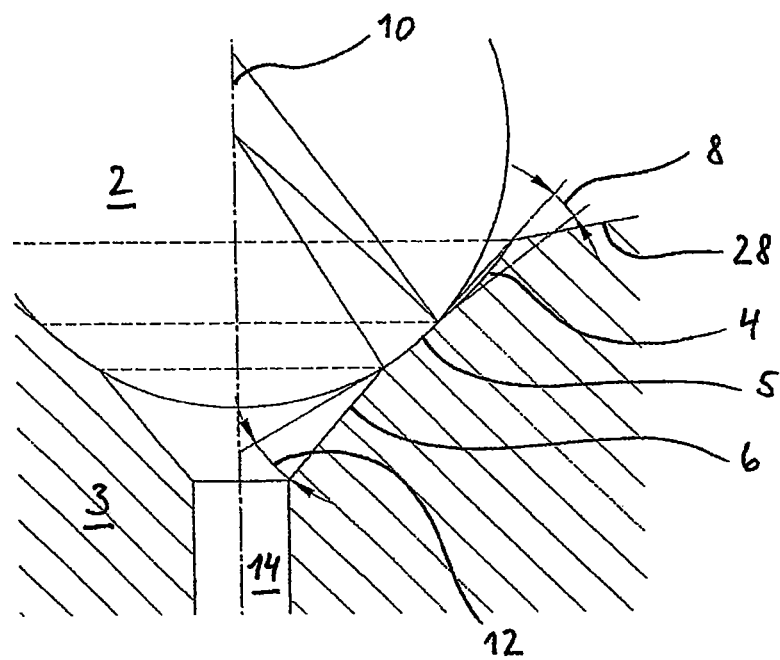
FIG. 3a shows a highly enlarged illustration of a valve seat of a closed micro-valve according to a first embodiment of the invention, in the form of a longitudinal section along the valve center axis with a partially sketched valve ball, although none of the other components of the valve are illustrated, in particular the mobile armature.
Figure 3B:
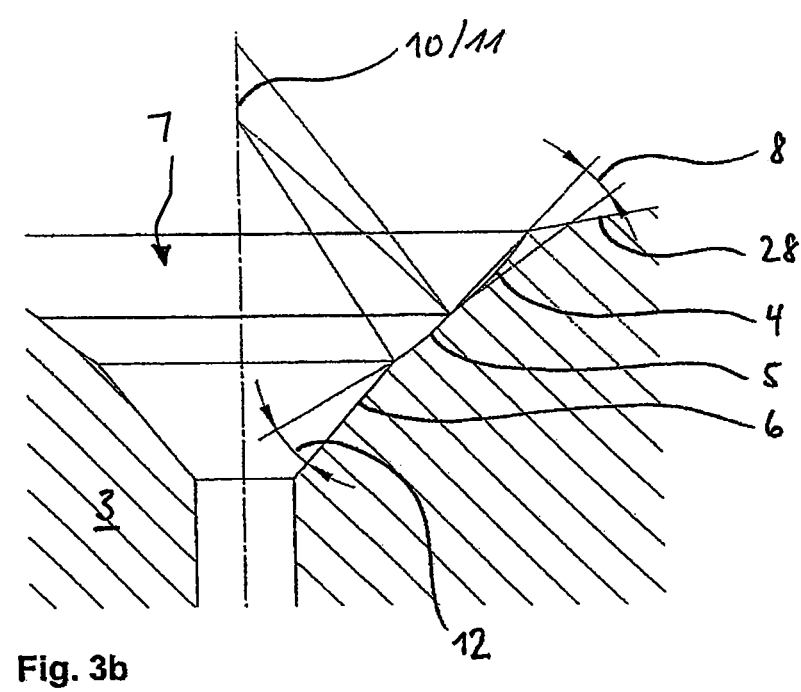
FIG. 3b shows a valve seat as shown in FIG. 3a, with the valve ball being omitted.
Figure 3C:
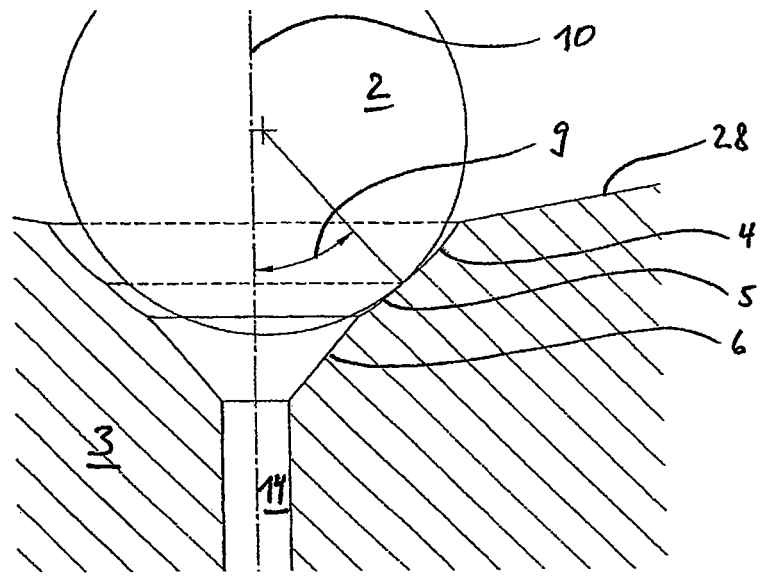
FIG. 3c shows a highly enlarged illustration of a valve seat of an open micro-valve according to a first embodiment of the invention, in the form of a longitudinal section along the valve center axis with a partially sketched valve ball, although none of the other components of the valve are illustrated, in particular the mobile armature, but the guide angle is particularly emphasized.

The guide area 4 denotes that area of the valve seat 3 which is located in front of the sealing area 5 in the flow direction of the medium 23. The geometry of the guide area defines an upper recess 7 between the valve ball 2 and the guide area 4. The guide area 4 is connected to the sealing area 5 at a transition angle 8, and is likewise preferably in the form of a spherical zone. The radius of the spherical zone of the guide area 4 is preferably greater than the radius of the spherical zone of the valve ball 2. The ratio of these two radii is 1.1 in the illustrated example. The transition angle 8 between the sealing area 5 and the guide area 4 must be kept small in order that the valve ball 2 is not subject to unnecessary wear at the transition of the valve ball 2 between these two areas. In the exemplary embodiment, the transition angle is between 2° and 4°. The gradient of the guide area 4 at the contact point of the valve ball 2 with the guide area 4 and the angle between the tangent through the contact point of the valve ball 2 with the guide area 4 and an auxiliary plane 11 at right angles to the valve center axis 10, the so-called guide angle, is of further interest. The guide angle 9 may alternatively, as is illustrated in FIG. 3c, also be defined as that angle which is created between the valve center axis 10 and an imaginary line between the valve ball center and the contact point of the valve ball 2 and the guide area 4. As already explained, this guide angle 9 ensures that the valve ball 2, which is raised out of the valve seat 3, is held in as gentle a manner as possible during closure of the micro-valve, and the forces which are created between the valve ball 2 and the contact point or touching point on the valve seat 3 remain as small as possible, in order that the valve ball 2 and the valve seat 3 are loaded as lightly as possible, and are not damaged. This guide angle 9 depends on the travel of the valve ball 2 and is a minimum of 25°, preferably more than 30°. That seat end surface 28 which faces the moving armature with the valve ball 2 may be on a plane at right angles to the valve center axis 10, or else may have a conical shape, as is illustrated in FIGS. 3a to 3d.

The valve seat 2 is advantageously produced by incorporating the hole for the nozzle channel 14 and a cone in a first step. An innermost component of this cone remains as the outlet area 6 in the finished micro-valve. The guide area 4 is ground in coaxially with respect to this cone, by means of a grinding ball, in a second step. The sealing area 5 is likewise ground in coaxially, by means of a second grinding ball, as the final step.

Other alternative production methods for the valve seats according to the present invention, in particular for the creation of the guide areas, comprise, for example, laser removal methods.

In the valve shown in FIGS. 3a to 3d, the outlet area 6 follows on that side of the sealing area 5 which is opposite the guide area 4. The outlet area 6 is formed by a cone which widens the nozzle channel 14 to the required size of the valve seat 3, is directly adjacent to the sealing area 5, and forms the transition from the sealing area 5 to the nozzle channel 14. It is intended to form a release angle 12 which is as large as possible to the sealing area 5. A large release angle 12 assists the flow of the medium 23 to be metered and prevents the valve ball 2 from sticking in the sealing area 5, particularly in the case of sticky media 23. In the illustrated example, the release angle 12 is 15°.

Figure 3D:
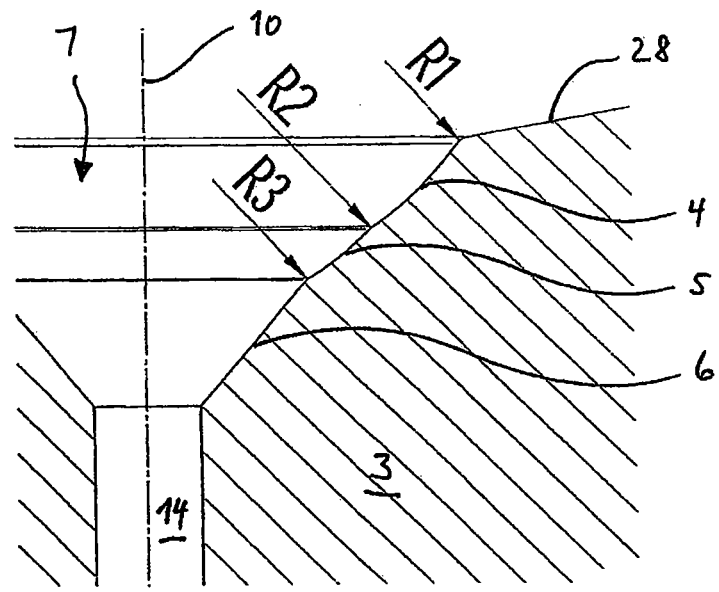
FIG. 3d shows one preferred embodiment of a valve seat, with the radii in the transition between the individual areas being emphasized.

One preferred embodiment of a micro-valve 1 has rounded transitions between the various areas of the valve seat 3. FIG. 3d shows these radii, radius R1 in the transition between the seat end surface 28 and the guide area 4, radius R2 in the transition between the guide area 4 and the sealing area 5, and radius R3 in the transition from the sealing area 5 to the outlet area 6. The radius R2 between the guide area 4 and the sealing area 5, in particular, once again reduces the wear on the valve ball 2 when the valve closes. The wear-reducing rounding of the transitional zones is indicated in FIG. 3d. The radius size is defined from the production engineering point of view primarily for R1, with this being a minimum of R=0.02 mm, a maximum of R=0.1 mm, and preferably R=0.03 to 0.06 mm. The radii R2 and R3 are automatically also produced using known manufacturing techniques (brushing, barrel finishing), that are smaller since these zones do not offer as much edge to act on for the rounding.

Figure 4:
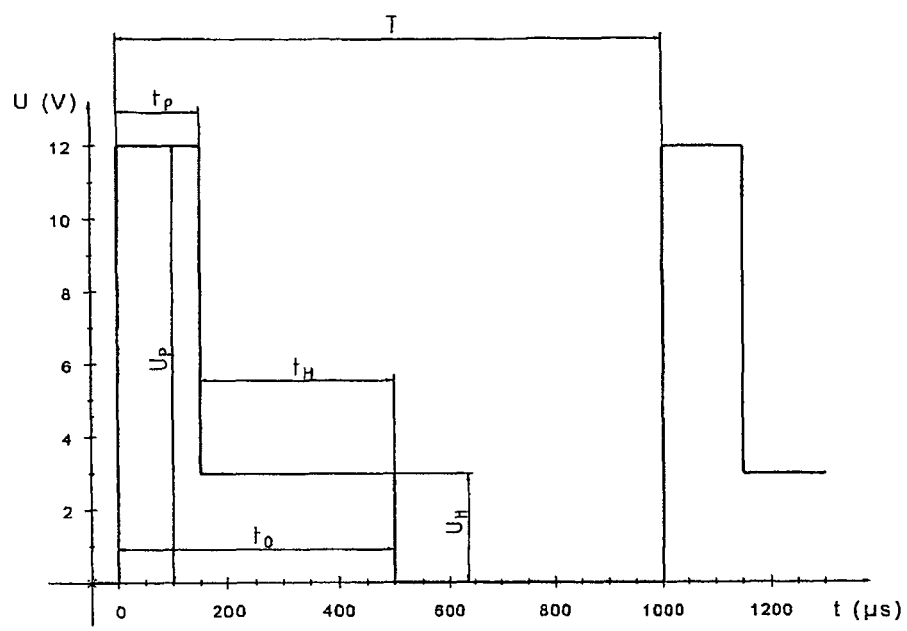
FIG. 4 shows a typical voltage profile for driving a micro-valve according to the invention.

FIG. 4 shows a typical profile of the drive for continuously repeated metering at 1 kHz and with a valve opening time of 500 µs. The illustration shows the profile for an ideal resistive load. For the best performance at very high frequencies, the drive is preferably provided by means of a stepped voltage pulse feed (peak and hold). In this case, rapid and defined opening of the micro-valve 1 is achieved with a short, increased voltage pulse $U_P$ (for example $U_P$=12 V or $U_P$=24 V). Once the micro-valve 1 has been opened, a lower holding voltage $U_H$ is sufficient ($U_H$=2-3 V) for the rest of the time for which it is open.

In this case:

T is the period duration $$\left(T = \frac{1}{\text{Frequency}}\right)$$

$t_0$ is the valve opening time (quantity control as a function of the pressure)

$t_P$ is the peak pulse time (matched to the valve and purpose, no longer changed during operation)

$t_H$ the hold time $U_P$ the peak opening voltage $U_H$ the holding voltage

In this case, the minimum opening time for a defined opening of the micro-valve 1 is:

$t_{0\ min}$=$t_P$ (typically, $t_P$=150 µs for the basic variants according to the invention)

The maximum opening time per cycle is calculated from the period duration minus the valve closing time:

$t_{0\ max}$=T-$t_R$ ($t_R$ is the response time of the valve)

$t_R$≈200 µs can normally be expected for the valves according to the invention, although the value is highly dependent on the purpose and the environment.

Since the coil 17 represents an inductive load, the profile of the control voltage is distorted in reality. The control electronics must destroy the self-induction of the coil 17 after switch-off as quickly as possible, by means of suitable measures, in order to reduce negative influences, particularly at high frequencies or when exact closing times are required. The latter is the case, for example, in metering technology.

Figure 5A:
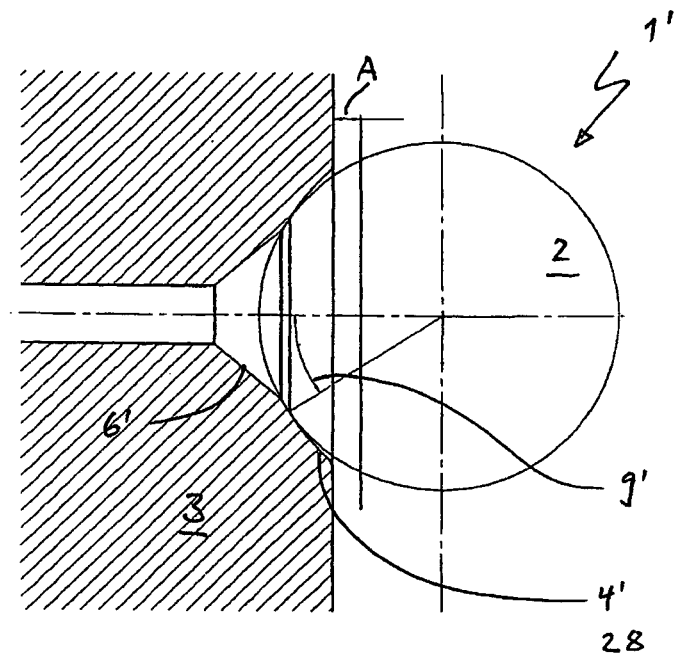
FIG. 5a shows an enlarged illustration of a valve ball in a valve seat according to a further embodiment of the invention, with a large outlet area and a large guide area, with the valve closed.
Figure 5B:
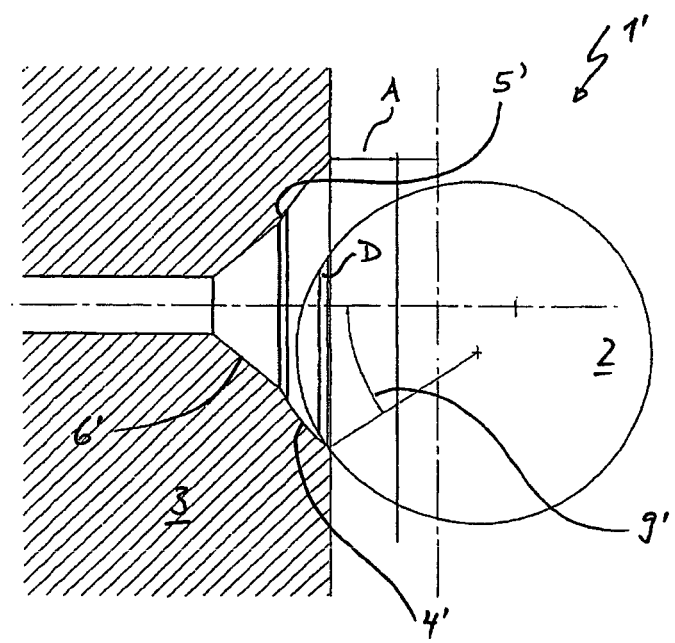
FIG. 5b shows an illustration of the valve ball in the valve seat as shown in FIG. 5a, with the valve open.

FIGS. 5a and 5b show an enlarged illustration of the valve ball 2 in a valve seat 3 with a large outlet area 6' and a large guide area 4', and a correspondingly smaller sealing area 5', with the micro-valve 1' closed and open. This geometry represents an optimized version for guidance of the valve ball 2 only via the valve seat 3. If the basic cone or outlet area 6' is large, the guide angle 9' remains relatively large, despite a larger guide area 4'. The valve ball 2 also does not rub over the guide area 4' with a 0.1 mm travel, and the maximum possible lateral deflection of the valve ball 2 has approximately the same value as the travel H. In the double-ground geometry shown in FIG. 5, the valve seat has a relatively small guide area. The guide ball is correspondingly deflected massively to the side when the travel is relatively large, and the sealing zone rubs over the radius between the seat end surface and the guide area, as soon as the travel is greater than 0.02 mm. The illustrated geometry is therefore primarily suitable for low-travel use and for use with armature guides such as those which will be described in even more detail, by way of example, in the following text.

In FIG. 5b, and in the subsequently described FIGS. 6b and 7b, which each show the embodiments according to the invention in the open state, a sealing zone D' is indicated on the ball, and interacts with the sealing area 5' in the closed state. This sealing zone is indicated purely functionally and only in the drawing. The ball surface is spherical in this sealing zone.

Figure 6A:
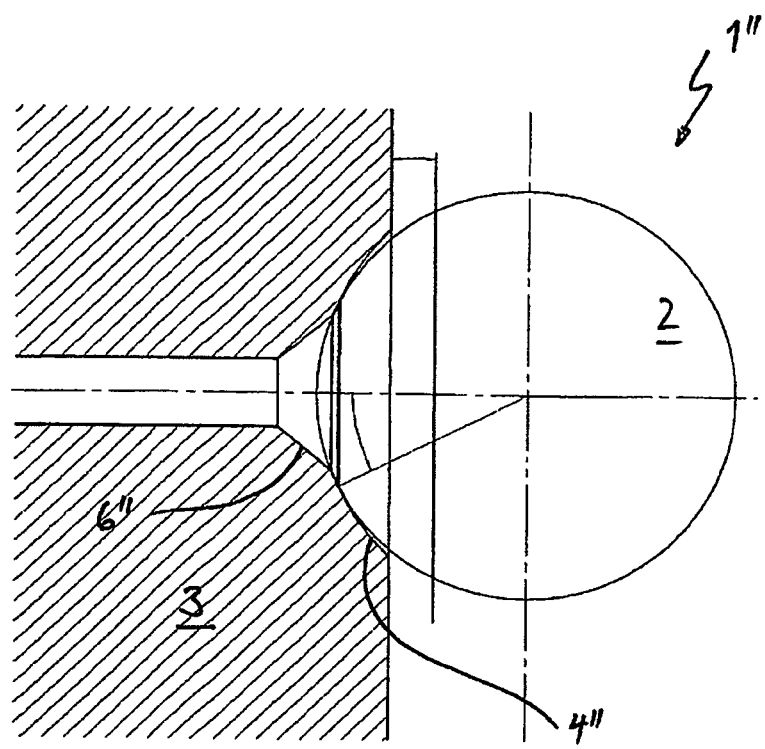
FIG. 6a shows a enlarged illustration of a valve ball in a valve seat according to a further embodiment, with a small output area and a large guide area, with the valve closed.
Figure 6B:
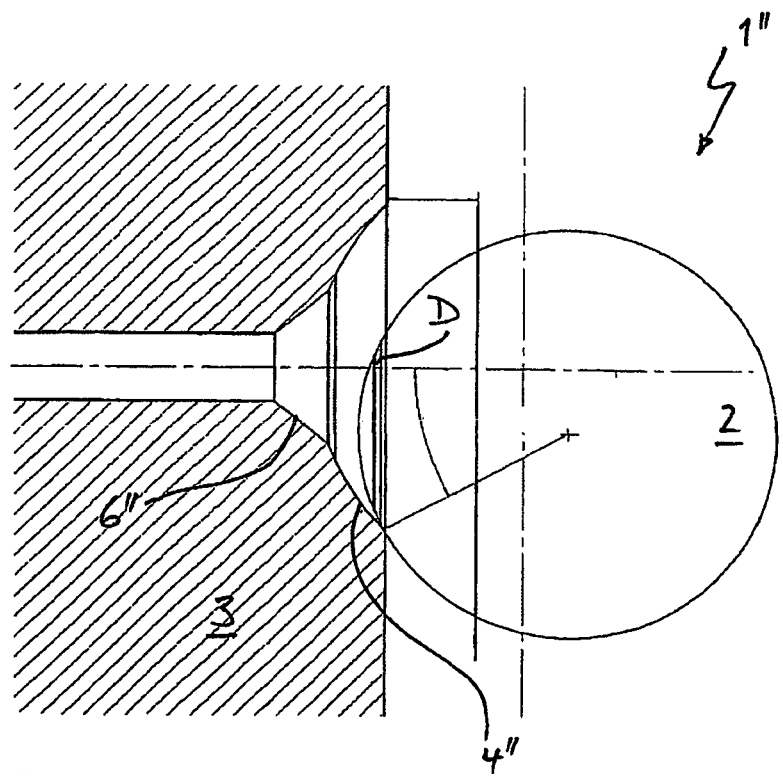
FIG. 6b shows an illustration of the valve ball in the valve seat as shown in FIG. 6a, with the valve open.

FIGS. 6a and 6b show enlarged illustrations of the valve ball 2 in a valve seat 3 in a further exemplary embodiment with a small outlet area 6" and a large guide area 4", with the micro-valve 1" closed and open. The embodiment shown in FIG. 6 has the same basic cone in the geometry as the product shown in FIG. 5, but the guide area is massively enlarged. This means that the sealing zone now virtually no longer rubs at all over the radius between the seat end surface and the guide area during operation. However, to do this, it is accepted that the sealing seat, or the sealing area, is located considerably further forward on the valve ball, which leads to poorer guide angles in the closed state. In this embodiment as well, the deflection to the side is quite major in the unguided state of the mobile armature.

Figure 7A:
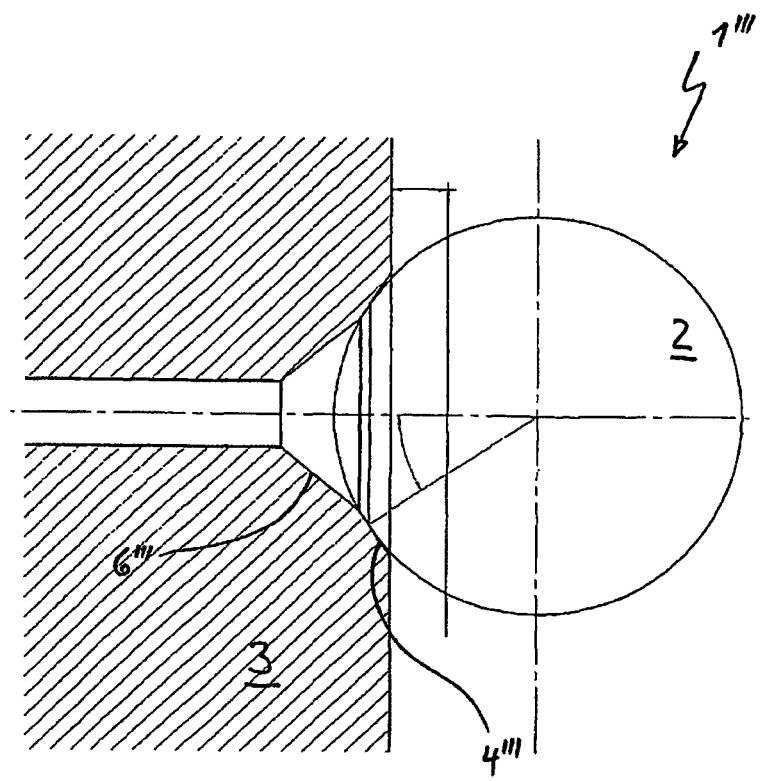
FIG. 7a shows an enlarged illustration of a valve ball in a valve seat according to a further embodiment, with a large outlet area and a small guide area, with the valve closed.
Figure 7B:
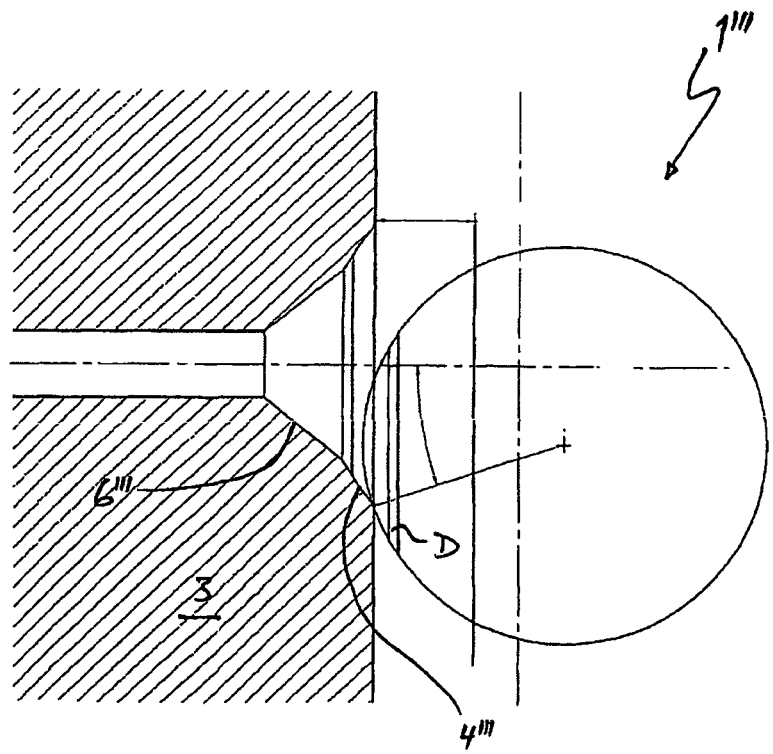
FIG. 7b shows an illustration of the valve ball in the valve seat as shown in FIG. 7a, with the valve open.

FIGS. 7a and 7b show an enlarged illustration of the valve ball 2 in a valve seat 3 in a further exemplary embodiment with a large outlet area 6''' and a small guide area 4''', with the micro-valve 1 closed and open. This geometry represents one preferred embodiment for guidance of the ball primarily via the seat, in which no separate armature guide is used. As a result of the basic cone, which is somewhat larger than in the embodiments shown in FIGS. 5 and 6, and which results in a relatively outlet area, the guide angle remains relatively large, despite a greater initial ground area. Even with a travel of 0.1 mm, the sealing zone does not rub over the contact zone on the radius between the seat end surface and the guide area, and the lateral deflection is still only virtually 1:1 with respect to the travel. The distance A between the armature sleeve 22 which holds the ball 2 and is not illustrated any further in the figure and the seat end surface 28 is now at a minimum of about 0.067 mm, which should not be undershot in order not to introduce any further restriction into the system.

Typical characteristic data for one exemplary embodiment is shown below:

| Characteristic | Value |
| --- | --- |
| Nozzle diameter | ø 0.15 mm |
| Pressure range | 0-20 bar (typical use 0.3-1.5 bar) |
| Filtration | 17 µm (in-line arrangement at the inlet) |
| Media which can be metered | Water and solvents or reagents; inks based on water, N-propanol, DMSO, MEK and other solvents In certain circumstances, also liquid adhesives, softeners, oils, detergents, gases |
| Material in contact with the media | Stainless steel, sapphire, ruby |
| Electrical drive | Preferably peak + hold drive Peak voltage: 12 or 24 V Hold voltage: 2-3 V When peak + hold is not used for the feed, the DC operating voltage must be in the region of the hold voltage |
| Coil resistance | 9.2 ohms |
| Max. coil temperature | 100° C. |
| Electrical drive | Preferably peak + hold drive Peak voltage: 12 or 24 V Hold voltage: 2-3 V |

| Characteristic | Value |
| --- | --- |
| | When peak + hold is not used for the feed, the DC operating voltage must be in the region of the hold voltage |
| Coil resistance | 9.2 ohms |
| Max. coil temperature | 100° C. |

Examples of dynamic characteristic data (values relating to N-propanol and 0.7 bar pressure difference):

| Characteristic | Value |
| --- | --- |
| Max. flow with continuous opening | 8 ml/min |
| Min. metered amount (single 150 µs opening pulse) | 20 nl |
| Repetition accuracy (without feedback control) | <5% CV* |
| Repetition accuracy (with feedback control) | <2% CV* |
| Typical response time | 200 µs |
| Maximum metering frequency | ~2 kHz* |

*Depending on the environment and the application

In further advantageous embodiments of the valves according to the invention, the closing balls and the mobile armature are guided entirely or partially by a multifunctional armature guide, which also acts as a seat holder.

The retention and installation of the valve seat and mobile armature are of central importance in a micro-valve that uses hard material for sealing. The mobile armature should be mounted such that it can move and is easily accessible, and should nevertheless always find its closed position in the valve seat again as directly as possible. At the same time, very good motion dynamics should be ensured, and the components should nevertheless be protected, in order to achieve as long a life as possible.

The valve seat or nozzle block must be sealed with respect to the valve housing and it must remain accurately in position after installation. The nozzle outlet should be as freely accessible as possible, without interfering components around it.

Figure 8:
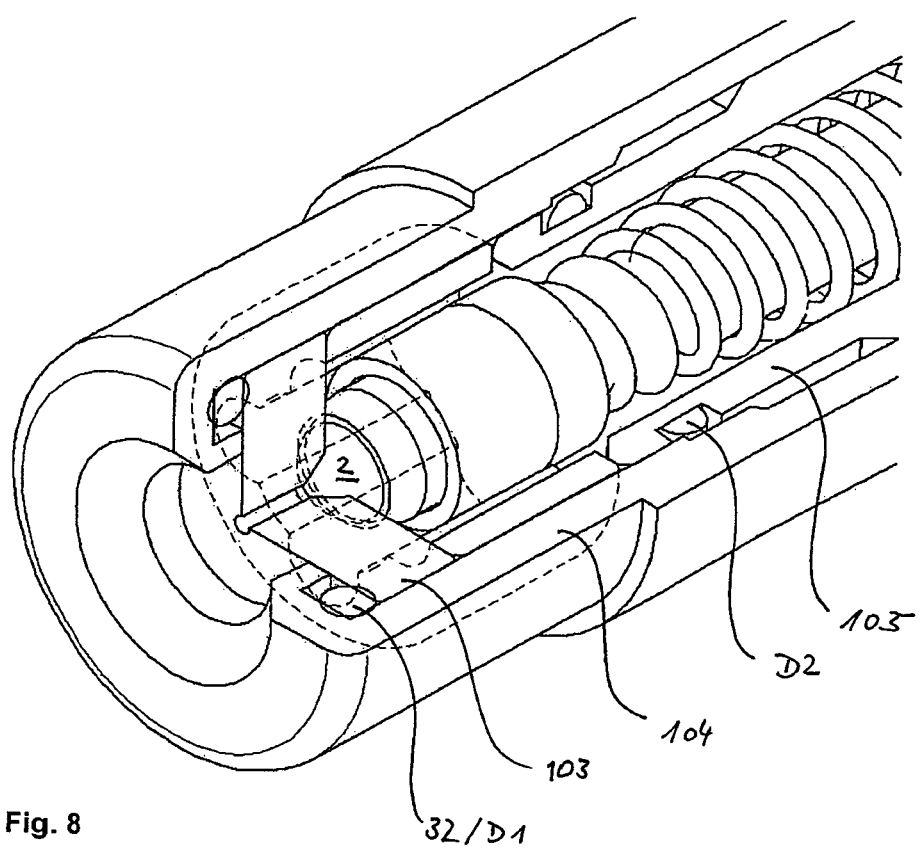
FIG. 8 shows a perspective view of a partially sectioned lower front area of a micro-valve according to the prior art, with a two-part valve housing, with an element for guidance of the armature being illustrated by dashed lines.

The applicant is aware of the guide system as illustrated in FIG. 8 for micro-valves, which, for assembly reasons, requires a multi-piece housing. This means that at least two sealing points D1, D2 are required between the housing parts 104, 105 and between the housing part 104 and the valve seat 103, in order to ensure that no medium to be metered can emerge in an uncontrolled manner. In order to keep the diameter of the valves small, a first sealing ring 32 is placed onto the lower end surface of the valve block 103 at a first sealing point. The nozzle outlet is thus recessed, or is set back upwards with respect to the lower face of the valve and is not flush with the front. The main problems with the known guide systems result from the stringent requirements for the manufacturing tolerances, since production errors in the individual components can accumulate and can lead to a total error which is outside the maximum permissible tolerance for the guide. In order to ensure roundness of the guide with respect to the valve seat 103 despite these tolerance build-up effects, the individual components are subject to very tight tolerances, which make them complex and expensive to manufacture.

Figure 9A:
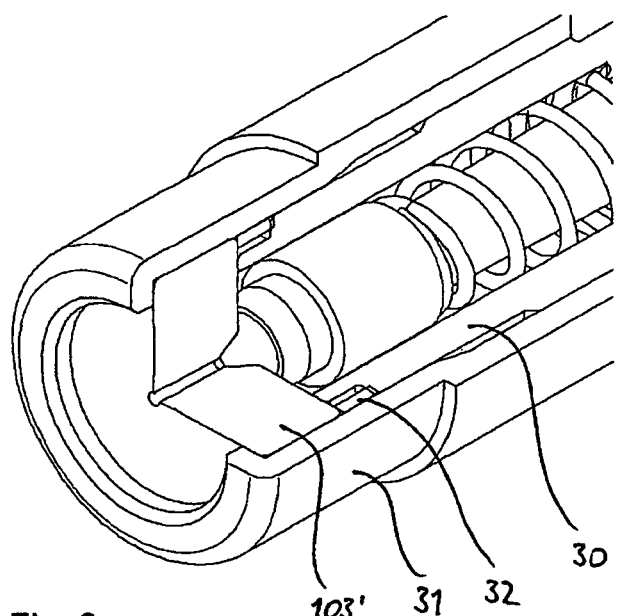
FIG. 9a to FIG. 9d each show a perspective view of a partially sectioned lower front area of a micro-valve, in each case according to one embodiment of the invention, illustrating different versions for attachment and sealing of the valve seats in the housing.
Figure 9B:
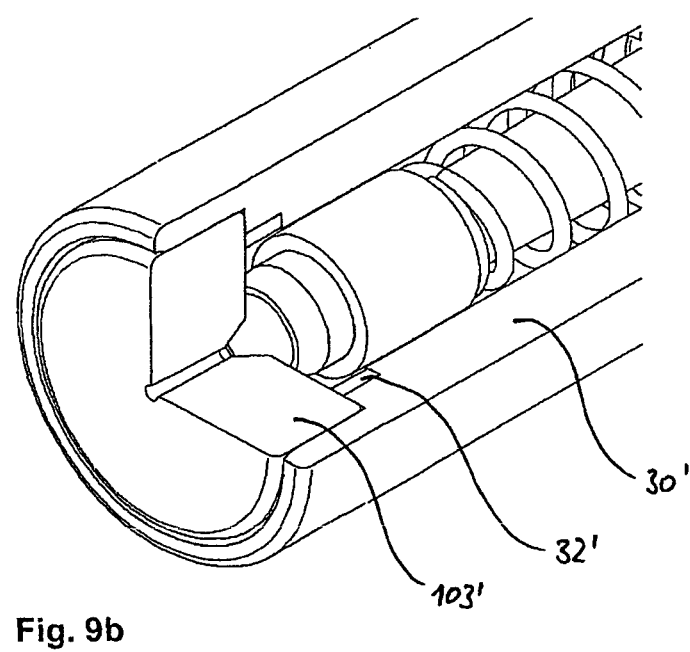
Figure 9C:
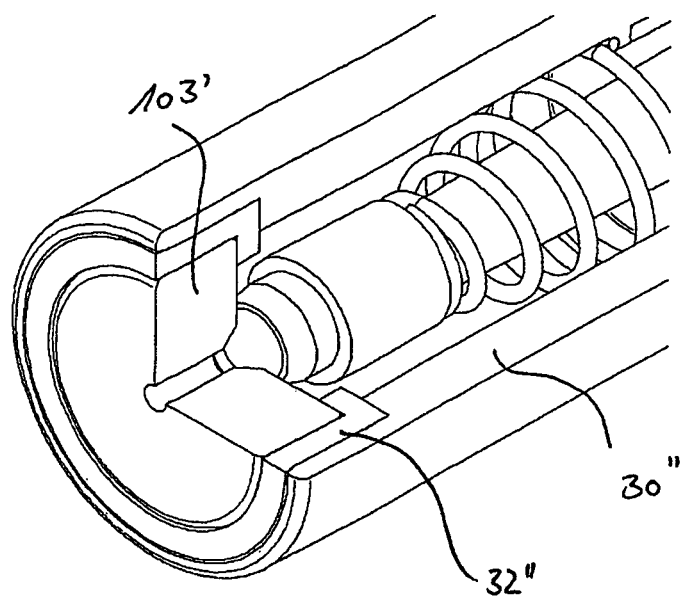
Figure 9D:
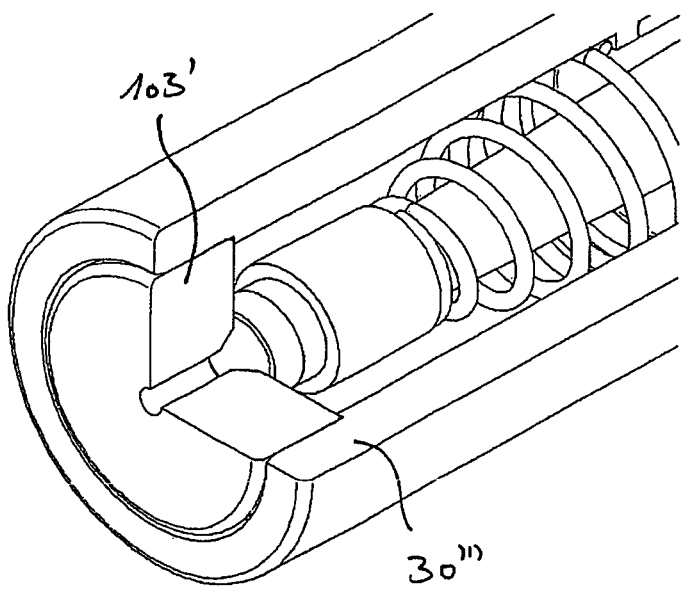

The embodiments which have already been described above in which the guidance is provided purely by means of the interaction between the valve ball and the valve seat, are particularly advantageous for short travels in the region below 0.04 mm. Since the guide area in these embodiments is arranged directly in the valve seat, this reliably avoids the negative tolerance build-up effects. The mobile armature is guided during opening and closing of the valve via the guidance of the ball in the previously described guide area in the valve seat. FIG. 9 illustrates various options for attachment and sealing of valve seats with an integrated guide area with respect to the valve housing. FIG. 9a shows a screw version, in which the valve seat 103' is attached by means of a screw cap 31 to the lower end of the valve housing 30 and a sealing ring 32 composed of PEEK prevents fluid from emerging between the valve seat 103', the housing 30 and the screw cap 31. In FIG. 9b, the valve seat 103' is pressed directly into an appropriate receptacle in the valve housing 30', and a sealing ring 32' composed of PEEK (polyetheretherketone) once again seals the fluid area in the housing 30' with respect to the valve seat 103'. A further pressing version with a larger sealing ring 32", once again preferably composed of PEEK, is illustrated in FIG. 9c. The sealing ring 32" surrounds the side casing surface of the valve seat 103' completely, and also forms the upper stop, such that the valve seat, which is preferably manufactured from a hard material such as ceramic or sapphire, does not come into contact with the metal housing 30". The retention of the brittle valve seats in the relatively elastic PEEK sealing ring 32" has been found to be highly advantageous particularly when the valve seat is pressed in during manufacture. FIG. 9d shows a further embodiment, in which the valve seat 103' is pressed directly into an accommodation area of the valve housing 30''', and the sealing between the two components is achieved by means of a flat adhesive joint.

Further embodiments of the micro-valves according to the invention, which will be described in more detail in the following text, are preferably used with longer travels of more than 0.04 mm. In this case, a single multifunctional guide element is used not only to hold and seal the valve seat but also to accurately guide the mobile armature in the front area, with a clearance fit. The guide element is preferably manufactured from polyetheretherketone (PEEK), a partially crystalline high-performance plastic, which has first-class mechanical characteristics and very good chemical and temperature resistance.

Figure 10A:
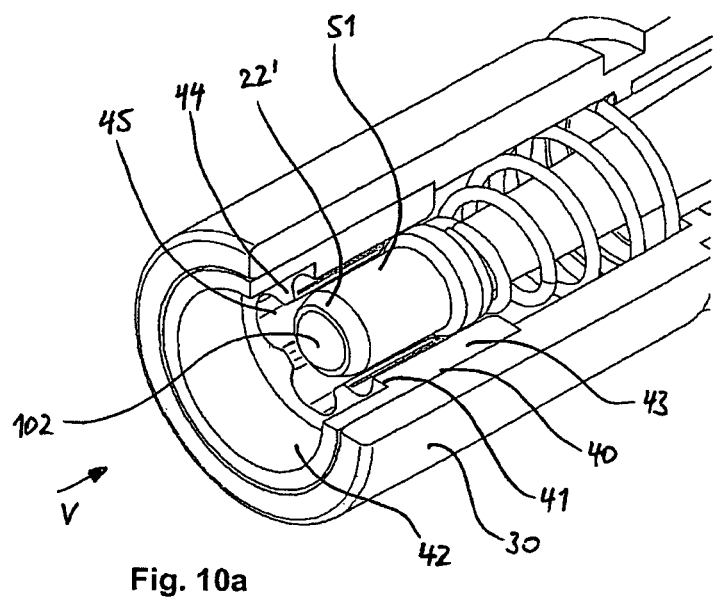
FIG. 10a shows a perspective view of a partially sectioned lower front area of a micro-valve according to a further embodiment of the invention, with an integral guide element, and with the valve seat not being illustrated.

FIG. 10a shows a lower end area, also referred to as a front area, of a micro-valve according to one preferred embodiment, in which the valve seat is omitted, illustrated partially sectioned. An integral guide element 40, which is provided with a step, is inserted into the essentially cylindrical valve housing 30 in order to accommodate the valve seat 103. The step 41 subdivides the guide element 40 essentially into two areas, with the valve seat 103 being inserted in a lower, circular-cylindrical accommodation area 42, whose height is matched to the height of the valve seat such that it comes to rest with the upper end surface on the step 41, and the opposite outlet-side end surfaces are aligned with one another. The upper area 43 of the guide element 40 carries out the actual guidance function and has four guide webs 44, which project inward, which define four fluid channels 45 at uniform distances from one another, which each run between adjacent guide webs 44. In the illustrated exemplary embodiment, the four guide webs 44 run parallel to the axis and aligned inwards with respect to the valve center axis. The guide webs 44 define a circular-cylindrical guide zone 46, which is located coaxially with respect to the valve center axis, and in which a guide sleeve 51 of the mobile armature 16' is guided with a small amount of play, preferably a few hundredths of a millimeter. This play is due in particular to manufacturing tolerances, but can also be chosen to be less than this, with appropriate precision. The receptacle 22' for the valve ball 102 is seated coaxially on the lower end of the guide sleeve 51.

Figure 10B:
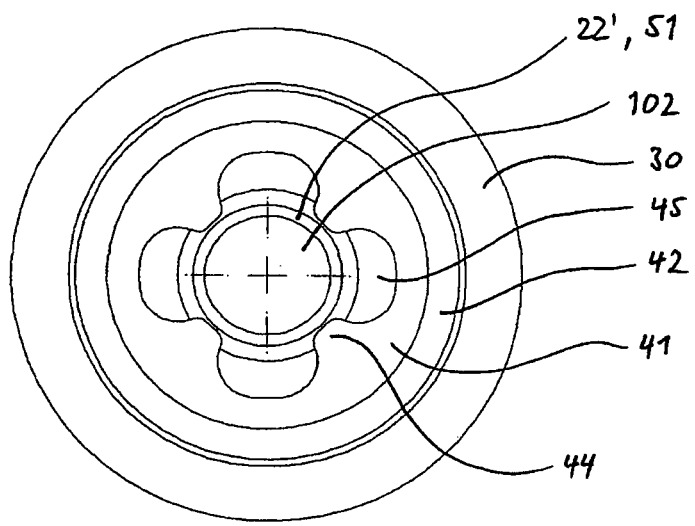

FIG. 10b shows a view in the direction V of the guide zone 46 of the embodiment shown in FIG. 10a. It is now possible to clearly see the fluid channels 45 which are defined by the guide webs 44. The guide sleeve 51 is passed through the guide webs 44 with little play.

FIG. 11 shows a comparative illustration, in each case showing a cross-sectional view and a side view, of the deflection of the valve ball and mobile armature for a travel of 0.1 mm in a valve according to the prior art, without guidance in the valve seat and without a guide element (FIGS. 11a and 11b), and for a valve according to the present invention with an integral guide element (FIGS. 11c and 11d). In the unguided version shown in FIGS. 11a and 11b, the valve ball 102' is severely deflected from the center, that is to say by more than the travel height (0.174 mm in the illustrated example), which quite obviously results in disadvantages in terms of dynamics, life and the jet pattern. In the guided version shown in FIGS. 11c and 11d, the ball in contrast primarily has to carry out a sealing task and scarcely any guidance task, since the deflection from the center axis is reduced to a fraction of the travel height (0.034 mm in the illustrated example).

One major aspect of the present invention is that the integral guide element considerably increases the accuracy of the positioning of the valve seat and valve ball with respect to one another, since it governs the axial position of the two elements relative to one another.

The illustrated exemplary embodiment in FIG. 11 shows that the guide element 40' on the one hand holds the valve seat 103 and seals it with respect to the valve housing, and at the same guides the guide sleeve 51' at the lower end of the mobile armature, thus ensuring extremely precise coaxial alignment of the valve ball and valve seat with respect to one another. When the valve is opened, this therefore means that the closing ball 102' and the sealing area, as well as the guide area in the valve seat, form an approximately uniform annular gap, as a result of which there is no negative influence on the flow dynamics of the medium to be metered. The guide element 40' optimizes the guidance of the mobile armature in particular when there is a long opening travel, as well, that is to say when the valve ball is raised completely out of the valve seat and therefore ensures a minimal load on both sealing partners on closure of the valve. This leads to a very long life and very good dynamics being achieved. The preferred configuration of the fluid-guiding areas in the interior of the guide element leads to the greatest possible reduction in the hydrodynamic dead volume.

Figures 12A, 12B:
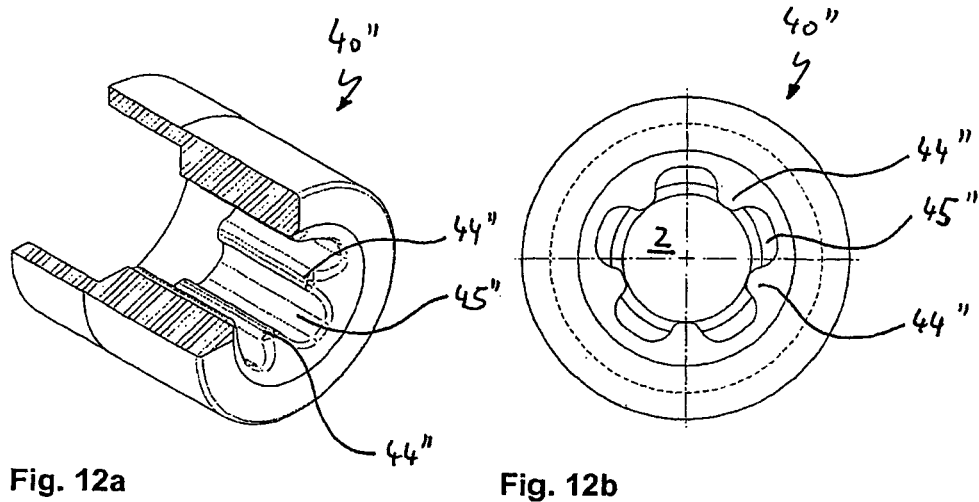
FIG. 12a shows a perspective view of a partially sectioned guide element according to one embodiment of the invention.
FIG. 12b shows a cross section through a guide zone of the guide element as shown in FIG. 12a, in a micro-valve.

FIG. 12a shows a perspective view, obliquely from above, of a partially sectioned guide element 40" according to a further embodiment, with five guide webs 44".

Figure 12C:
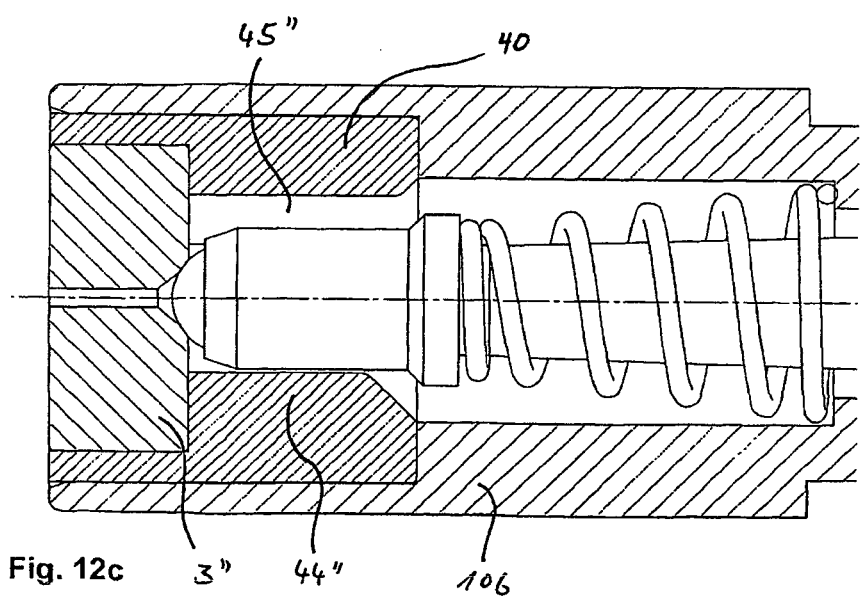
FIG. 12c shows a front area of a micro-valve as shown in FIG. 12b, in the form of a longitudinal section.
Figure 12D:
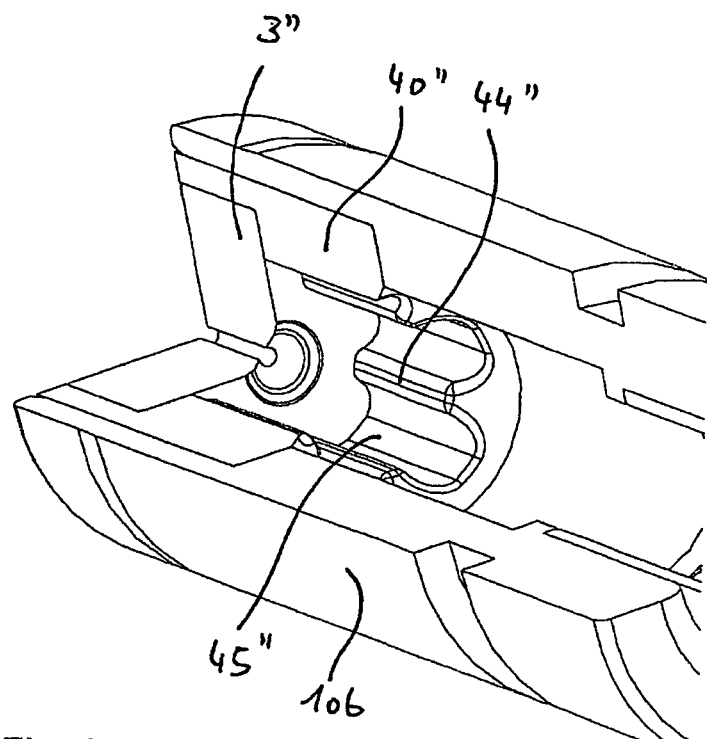
FIG. 12d shows a perspective view of a partially sectioned lower front area of a micro-valve as shown in FIGS. 12b and 12c, with the mobile armature not being illustrated, allowing the valve seat to be seen.
Figure 12E:
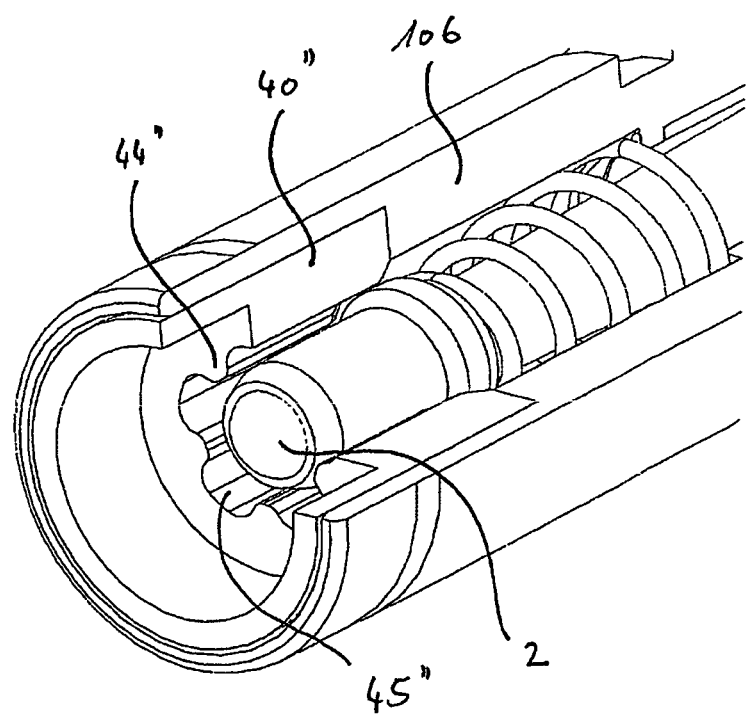
FIG. 12e shows a perspective view of a partially sectioned lower front area of a micro-valve as shown in FIGS. 12b and 12c, in a view of the valve front, obliquely from underneath, with the valve seat not being illustrated, allowing the guide element to be seen.

In general, it can be said that the guide elements according to the invention are preferably produced using the plastic injection-molding method. This makes it possible to produce the webs with smooth transitions and minimized dead volumes, as is illustrated in the view shown in FIG. 12a. As can be seen from FIG. 12b, the five guide webs 44" ensure optimum guidance of the armature with the valve ball 2. FIG. 12c shows the guide and sealing element 40" in the installed state, in the form of a section along the valve longitudinal axis. The valve seat 3" and the lower area of the integral valve housing 106 are likewise shown in the form of a section. The lower components of the mobile armature with the valve ball 2, the guide element 40″ and the spring are likewise illustrated in the form of a section. The upper half of the view shows a section view of a fluid channel 45″, while a guide web 44″ is shown in a section view in the lower half of the figure. The axial position of the mobile armature is defined precisely in the area by the interaction between the cylindrical guide sleeve and the five webs. FIGS. 12*d* and 12*e* show a perspective view, obliquely from above and obliquely from underneath, of a partially sectioned micro-valve in the area of a guide element, according to the embodiment described above with five guide webs, with the valve ball, the mobile armature and the closing spring not being illustrated in FIG. 12*d*, and with the valve seat not being illustrated in FIG. 12*e*.

Figure 13B:
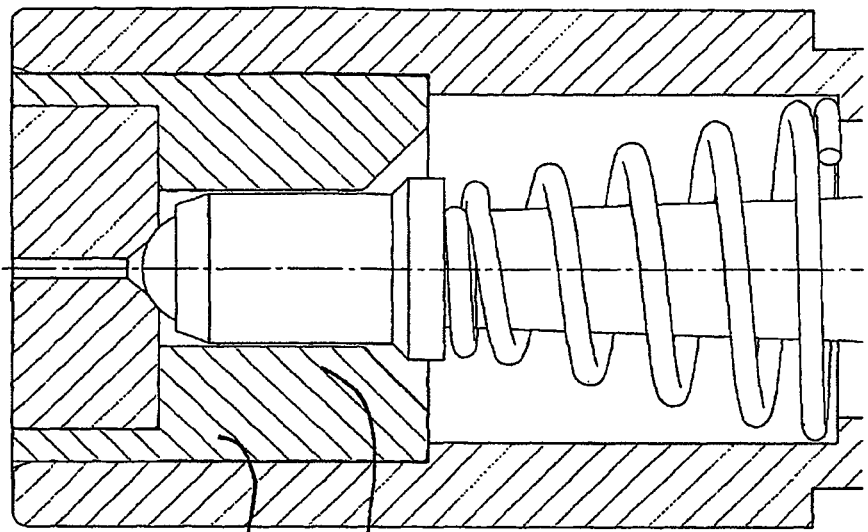
FIG. 13b shows a longitudinal section through the front area as shown in FIG. 13a, with the section plane running through the fluid channels.
Figure 13B:
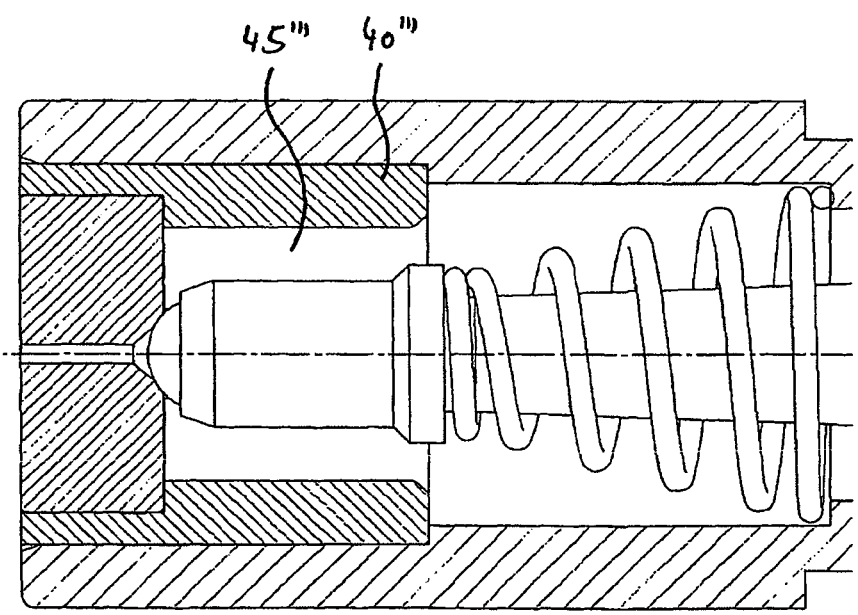
Figure 13C:
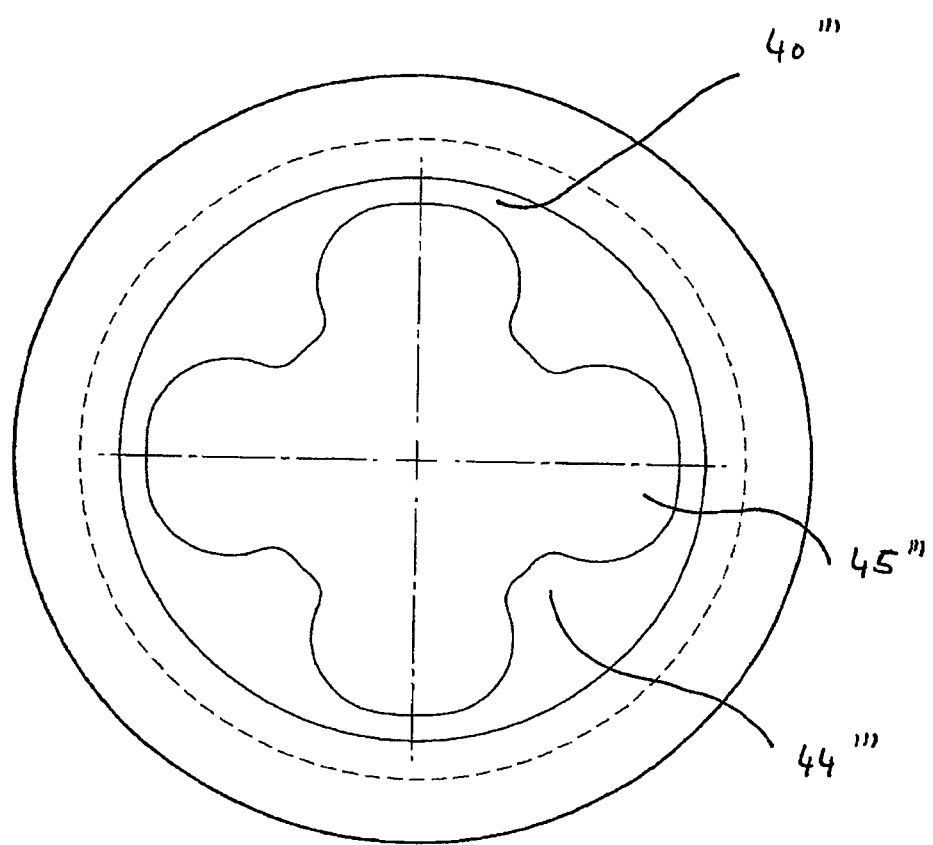
FIG. 13c shows a cross section through a guide zone of the guide element shown in FIGS. 13a and 13b.

Valves according to a further embodiment of the invention, as are illustrated in FIGS. 13*a* to 13*c*, are preferably used for high-viscosity media and for relatively large flow volumes. The optimization is in this case carried out with respect to the largest possible flow channels 45′″ and narrower guide webs 44′″ with acceptable armature guidance. Smooth transitions are also advantageous, and damaging dead volume is minimized.

The design of the front part with the multifunctional sealing and guide element, preferably composed of PEEK, modified PTFE, PPS Rayton or other high-quality technical plastics, which do not flow, have good chemical resistance and have high strength, allows the valve seat and nozzle to be installed flush with the front, which in turn allows simple cleaning as a result of optimum accessibility to the nozzle opening, while maintaining very short channel lengths in the nozzle. The sealing concept according to the invention is reliable and robust, and preferably uses chemically very highly resistant materials such as PEEK.

This allows simple installation, and therefore reduces the assembly cost. The production process is also simplified by the use of fewer components, while at the same time improving the accuracy of guidance and the roundness of the parts in comparison to the known multipart guidance concepts.

The fluid jet which emerges from the nozzle is more precise and is straighter, since fluid can flow uniformly all round the ball into the seat. The elimination of dead volume behind the valve seat prevents disruptive bubbles from accumulating.

Figure 14A:
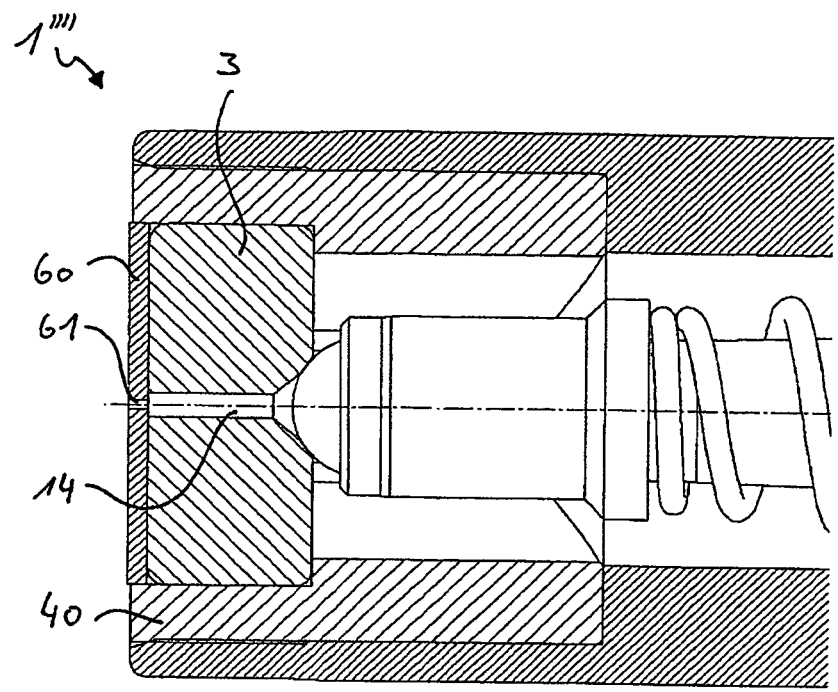
FIG. 14a shows a longitudinal section through a front area of a further embodiment of the micro-valves according to the invention, with an initial constriction for metering of very small amounts, and with the section plane running along the center axis.
Figure 14B:
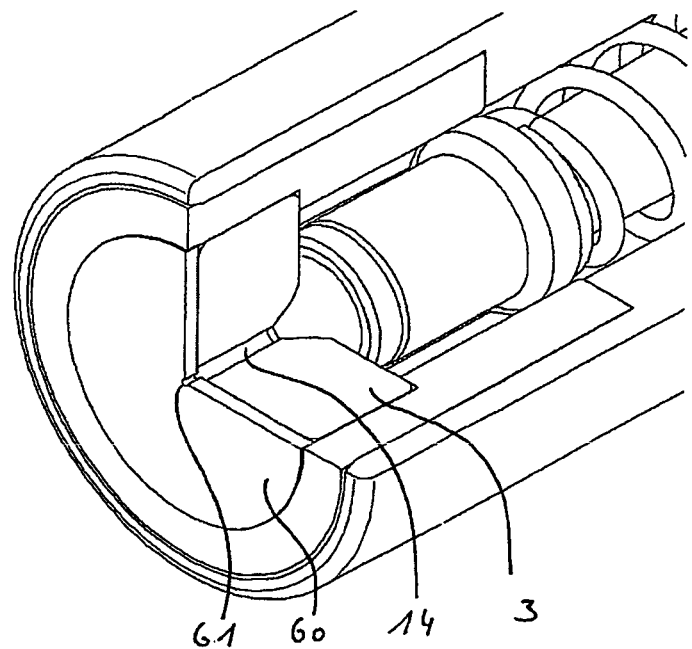
Figure 15:
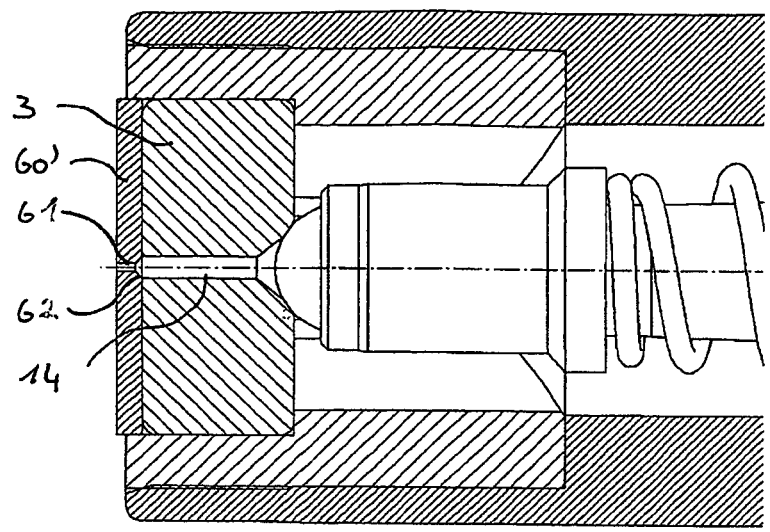
FIG. 15 shows a longitudinal section through a front area of a micro-valve with an initial constriction according to a further embodiment.
Figure 16:
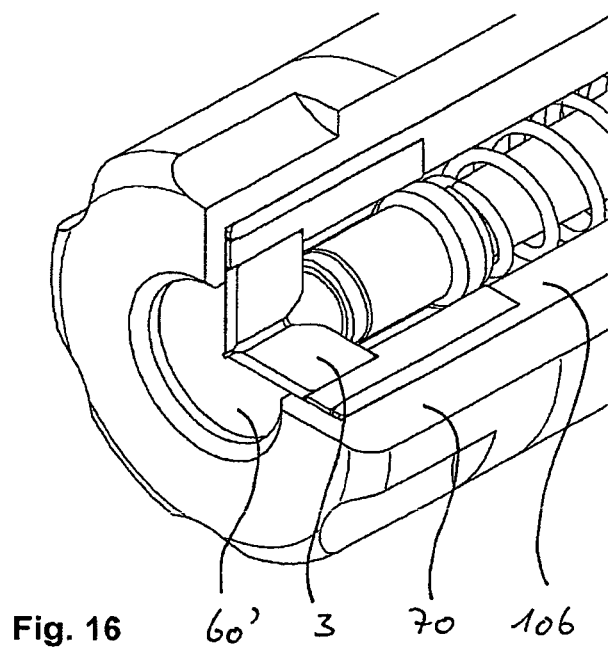
FIG. 16 shows a perspective view of a partially sectioned lower front area of a micro-valve according to a further embodiment of the invention, with an initial constriction which is held by a union sleeve.

FIGS. 14 to 16 show three embodiments according to the present invention, in which the outlet opening of the nozzle channel in the valve seat is followed by initial constrictions in order to restrict the fluid jet.

In the example shown in FIGS. 14*a* and 14*b*, the nozzle channel 14 of the valve seat 3 has a diameter of 0.15 mm. In the flow direction, the nozzle channel is followed by an initial constriction 60 with an aperture opening 61 with a diameter of 0.06 mm. The initial constriction in the illustrated embodiment is guided in the external diameter, is held concentrically with the valve seat in the accommodation area of the guide element 40, and rests in a fluid-tight manner on the valve seat. The aperture opening 61, which is preferably a simple hole for production efficiency reasons, is arranged centrally in the constriction, which is in the form of a disk, such that it is located concentrically with respect to the nozzle channel 14.

In the embodiment shown in FIG. 15, the aperture opening 61 in the constriction 60′ is provided with a chamfer 63 on the side facing the valve seat 3 and therefore facing the nozzle channel 14. The chamfer 63 is used to better introduce fluid into the restriction of the aperture opening 61. The chamfer cone angle is preferably between 60 and 90°. It is clear from the comparison with the constriction without a chamfer as shown in FIG. 14*a* that the preferred values mentioned above for the length and the diameter of the cylindrical constriction aperture opening 61 are preferably also retained in the embodiment with the chamfer 62, thus correspondingly increasing the thickness of the constriction 60′, with respect to the constriction 60 without a chamfer, by the area occupied by the chamfer.

In the embodiment shown in FIG. 16, the constriction 60′ is drawn against the valve seat 3 by a union sleeve 70, which is plugged externally over the valve housing 106′. One advantage of this type of attachment is that there is no need for direct attachment of the constriction to the valve seat by adhesive bonding or welding. For some applications, the use of a union sleeve 70 is disadvantageous, however, since the nozzle outlet, or the outlet from the initial constriction 60′, is no longer flush with the front.

Preferred application fields of the micro-valves according to the invention include, for example:

Inkjet field: printing Braille script
Textile machine field: lubrication with oil
Clock field: minimal-amount lubrication with oil
Ball bearing field: grease metering
Machine field: minimal-amount lubrication with oil
Wood industry: edge printing
Perfumery and aroma field: application of very small amounts of essences and aromas
Life Science field: metering system for fraction gatherers, biological screenings, cell research, analysis technology, research and development.

The invention claimed is:

1. A micro-valve (1) comprising:
    a valve ball (2) formed of sapphire, a valve seat (3) formed of ruby, and a nozzle (14);
    a stationary armature (18);
    a mobile armature (16) including the valve ball (2) disposed at an end of the mobile armature (16) that is opposite the stationary armature (18), the mobile armature movable with respect to the stationary armature to move the valve ball (2) and open the micro-valve (1);
    a guide element (40) including an upper guide area (43) divided from a wider lower circular-cylindrical accommodation area (42) by a step (41) formed in an inner wall of the guide element (40), wherein the valve seat (3) is sealed within the accommodation area (42) with a surface abutting the step (41), and a guide sleeve of the armature (16) is movably disposed within the upper guide area (43);
    fluid channels between the inner wall of the guide element and the guide sleeve of the armature, wherein a medium flows through the fluid channels, over the mobile armature, through the valve seat and out through the nozzle;
    the valve seat (3) including a sealing area (5), an outlet area (6) between and extending at an angle with respect to each of the sealing area (5) and the nozzle (14), and a guide area (4) forming an upper recess (7) between the valve ball (2) and the valve seat (3) when the micro-valve (1) is closed and seated in contact with the sealing area (5);
    the sealing area (5) including a first concave profile;
    the guide area (4) including a second concave profile;
    a transition connecting the second concave profile of the guide area (4) to the first concave profile of the sealing area (5) and comprising a transition angle of less than 10°; and wherein the outlet area (6) forms a lower recess (13) for the valve ball (2) when the micro-valve (1) is closed, and the angle of the outlet area (6) to the sealing area (5) forms a release angle (12) of 15°-25°.

2. The micro-valve (1) claim 1, wherein:
   the sealing area (5) includes a first concave profile having a first radius to form an interlocking sealed connection with the valve ball (2); and
   the guide area (4) includes a second concave profile having a second radius greater than the first radius.

3. The micro-valve (1) of claim 1, wherein the transition angle (8) between the sealing area (5) and the guide area (4) is less than $7^N$.

4. The micro-valve (1) of claim 1, wherein the valve seat (3) further includes a radius (R2) in the transition between the guide area (4) and the sealing area (5).

5. The micro-valve (1) of claim 1, comprising a medium pressure range of 0-20 bar.

6. The micro-valve (1) of claim 1, further comprising:
   a valve coil (17) around the mobile armature (16), wherein when the valve coil (17) is energized the mobile armature (16) is magnetized and moves toward the stationary armature (18) to move the valve ball (2) and open the micro-valve (1); and
   a closing spring (15) biasing the mobile armature (16) away from the stationary armature (18), wherein the closing spring is biased against a guide sleeve (51) of the mobile armature (16), and the guide sleeve (51) is in contact with the inner wall of the guide element (40) within the upper guide area (43).

7. The micro-valve (1) of claim 6, wherein an electromagnetic switching operation of the mobile armature (16) comprises a speed of 1000 Hz to 5000 Hz.

8. The micro-valve (1) of claim 6, wherein the switching operation moves the valve ball (2) less than 0.04 mm from the sealing area (5) of the valve seat (4).

9. The micro-valve (1) of claim 1, further comprising a closing spring (15) biasing the mobile armature (16) away from a stationary armature (18), wherein the closing spring is biased against a guide sleeve (51) of the mobile armature (16), and the guide sleeve (51) is in contact with the inner wall of the guide element (40) within the upper guide area (43).

10. The micro-valve (1) of claim 9, wherein an electromagnetic switching operation of the mobile armature (16) comprises a speed of 1000 Hz to 5000 Hz.

11. The micro-valve (1) of claim 9, wherein the switching operation moves the valve ball (2) less than 0.04 mm from the sealing area (5) of the valve seat (4).

12. The micro-valve (1) of claim 1, wherein the inner wall of the guide element in the upper guide area (43) comprises at least three guide webs (44), which project inwards toward the guide sleeve (51) and each of the fluid channels (45) is defined between pairs of the at least three guide webs (44), wherein the guide webs (44) are separated from one another uniformly by one of the fluid channels (45) and are arranged with their axes parallel to and aligned on the inside with the valve center axis.

13. The micro-valve (1) of claim 1, wherein the guide element (40) seals the valve seat (103) with respect to a valve housing, holds the valve seat (103) and guides the mobile armature (16) such that coaxial alignment of the valve ball (102) in the mobile armature (16) and the valve seat (103) with respect to one another is ensured solely by the guide element (40) as soon as the valve ball (102) is raised out of the valve seat (103).

14. A micro-valve (1) comprising:
   a valve housing;
   a valve ball (2);
   an electromagnetically movable mobile armature (16) within the valve housing and including the valve ball and a guide sleeve (51) adjacent the valve ball (2), wherein an electromagnetic switching operation of the mobile armature (16) comprises a speed from 1000 Hz to 5000 Hz;
   a valve seat (3) and a nozzle (14) at the end of the valve housing, wherein the valve seat (3) has a sealing area (5) adapted to receive the valve ball (2) in a closed position, and an outlet area (6) between the sealing area (15) and the nozzle (14);
   a guide means comprising:
      a guide area (4) arranged on the valve seat and wherein the guide area (4) forms an upper recess (7) for the valve ball (2) and for the sealing area (5) when the micro-valve (1) is closed, and at the same time has a transition to the sealing area (5) comprising a transition angle (8) between the sealing area (5) and the guide area (4) of a maximum of 10°; and
      a guide element (40) connecting and sealing the valve seat (3) to the valve housing, the guide element (40) including an upper guide area (43) divided from a lower accommodation area (42) by a step (41) formed in an inner wall of the guide element (40), wherein the accommodation area (42) is wider than the upper guide area (43) and the valve seat (3) is disposed within the accommodation area (42), and the mobile armature (16) is movably disposed within the upper guide area (43); and
   fluid channels (45) formed in the upper guide area (43) between the inner wall of the guide element (40) and the guide sleeve (51) of the mobile armature (16), wherein a medium flows through the fluid channels (45), over the mobile armature (16), through the valve seat (3) and out through the nozzle (14);
   wherein the guide area (4) has an essentially concave profile and the sealing area (5) of the valve seat (3) has an essentially concave profile, the valve ball (2) is in sealed contact with the sealing area (5) when the micro-valve (1) is closed, and wherein each of the valve ball (2) and the valve seat (3) is formed from a gemstone to form a hard-material pair.

15. The micro-valve (1) of claim 14, further comprising:
   a valve coil (17) disposed around the mobile armature (16), wherein when the valve coil (17) is energized the mobile armature (16) is magnetized and moves toward a stationary armature (18) to move the valve ball (2) and open the micro-valve (1); and
   a closing spring (15) biasing the mobile armature (16) away from the stationary armature (18), wherein the closing spring is biased against the guide sleeve (51) of the mobile armature (16), and the guide sleeve (51) is in contact with the inner wall of the guide element (40) within the upper guide area (43).

* * * * *